(12) United States Patent
Yamamoto et al.

(10) Patent No.: US 12,059,764 B2
(45) Date of Patent: Aug. 13, 2024

(54) VIBRATION MEASUREMENT DEVICE

(71) Applicant: YAMAMOTO METAL TECHNOS CO., LTD., Osaka (JP)

(72) Inventors: Kengo Yamamoto, Osaka (JP); Takayuki Yamanouchi, Osaka (JP); Koji Murakami, Osaka (JP); Ryo Matsuda, Osaka (JP); Masafumi Araki, Osaka (JP); Ryoga Shiotsu, Osaka (JP)

(73) Assignee: YAMAMOTO METAL TECHNOS CO., LTD., Osaka (JP)

( * ) Notice: Subject to any disclaimer, the term of this patent is extended or adjusted under 35 U.S.C. 154(b) by 0 days.

(21) Appl. No.: 17/609,298

(22) PCT Filed: Aug. 11, 2020

(86) PCT No.: PCT/JP2020/030600
§ 371 (c)(1),
(2) Date: Nov. 5, 2021

(87) PCT Pub. No.: WO2021/029404
PCT Pub. Date: Feb. 18, 2021

(65) Prior Publication Data
US 2022/0203493 A1  Jun. 30, 2022

(30) Foreign Application Priority Data

Aug. 9, 2019 (JP) .................................. 2019-148042
Feb. 10, 2020 (JP) .................................. 2020-020852

(51) Int. Cl.
*B23Q 17/12* (2006.01)
*G01H 11/08* (2006.01)
*G01M 1/22* (2006.01)

(52) U.S. Cl.
CPC .............. *B23Q 17/12* (2013.01); *G01H 11/08* (2013.01); *G01M 1/22* (2013.01)

(58) Field of Classification Search
CPC ........ B23Q 17/12; G01H 11/08; G01H 1/003; G01H 17/00; G01M 1/22; G01M 7/00; G01M 13/028; B23K 20/12
See application file for complete search history.

(56) References Cited

U.S. PATENT DOCUMENTS

2007/0088454 A1* 4/2007 Jalluri ................ G05B 19/4065
700/159
2009/0129882 A1* 5/2009 Tchouprakov ..... B23Q 17/0971
433/25
(Continued)

FOREIGN PATENT DOCUMENTS

CN 202411967 U 9/2012
CN 106625024 A 5/2017
(Continued)

*Primary Examiner* — Peter J Macchiarolo
*Assistant Examiner* — John M Royston
(74) *Attorney, Agent, or Firm* — NKL Law; Jae Youn Kim

(57) ABSTRACT

Provided a vibration measurement device for a rotary tool held by a tool holder that is coupled with a spindle and axially rotates in cooperation with the spindle. The vibration measurement device includes: a pair of acceleration sensors attached to a horizontal plane with respect to a rotary axis of a rotary tool in a manner symmetric to the rotary axis; an amplifier circuit that matches impedance of acceleration information from the acceleration sensors and amplifies voltage; a low-pass filter that removes predetermined high frequencies from an output signal of the amplifier circuit; and a subtraction circuit and an addition circuit that output a parallel vibration signal in an XY direction and a vibration signal in a rotational direction, respectively, from the output signal of the low pass filter.

5 Claims, 24 Drawing Sheets

(56) References Cited

U.S. PATENT DOCUMENTS

2019/0061086 A1* 2/2019 Bhinge ................ G10K 11/004
2019/0107461 A1* 4/2019 Ziada .................... G01M 7/025

FOREIGN PATENT DOCUMENTS

| JP | 8-85047 A | 4/1996 |
| JP | 2018-54611 A | 4/2018 |
| WO | 2015-022967 A1 | 2/2015 |
| WO | 2016-111336 A1 | 7/2016 |

* cited by examiner

VIBRATION MEASUREMENT DEVICE

TECHNICAL FIELD

The present invention relates to a vibration measurement device capable of detecting in real time effective values obtained by averaging vibrational acceleration detection data on a rotary tool used in a cutting device or the like, and a high-resolution waveform (high-resolution signal waveform ("waveform not subjected to averaging by RMS calculation and collected at a high sampling rate with frequency information not removed")).

BACKGROUND ART

In machining devices, such as cutting devices and friction stir joining devices, it is required to conduct evaluation (tool evaluation) of the state of a tool during machining, such as evaluation of wear, fatigue, damage, and chattering, in consideration of product accuracy and manufacturing efficiency of workpieces, and the yield of processed products. In the past, the tool evaluation has been conducted based on evaluation standards generalized for each device and tool by device manufacturers or tool manufacturers or based on evaluation standards academically standardized. However, real-time verification of actual tools during machining could not be conducted.

To cope with these circumstances, the applicant developed various types of thermal measurement techniques during machining by rotary tools and abnormality prediction techniques based on these measurement results, and provided them to society (Patent Literature 1, Patent Literature 2). Meanwhile, it is also known that important causes of tool damage or the like include vibration as well as temperature. However, there was no specific method of evaluating the vibration in real time during machining, and the evaluation of the vibration has been dependent on the five senses (a tactile sense, an acoustic sense, etc., in addition to a visual sense) of the skilled craftsmen at each machining site so far. Therefore, machining conditions standardized for tools and devices, and machining conditions based on the empirical rules of the skilled craftsmen, were not fully understood, and it was not always possible to say that high-speed, high-precision machining was objectively implemented.

As a solution, the inventors of the present invention have developed a vibration measurement device using a tool holder that detects in real time abnormal vibrations of a rotary tool used in a rotation machining device, and wirelessly transmits the measurement to an external PC or the like for analysis to make it possible to detect a sign of tool damage, improve machining accuracy, and shorten a machining period (see Patent Literature 3). The vibration measurement device with a tool holder uses a pair of acceleration sensors attached to a horizontal plane with respect to a rotary shaft in a manner symmetric to the rotary shaft. Due to the limits of radio transmission sampling rates, the vibration measurement device adopts a method of evaluating effective values, obtained by averaging acceleration outputs by root means square (RMS) calculation, as an average vibrational acceleration during machining.

However, although the method of outputting effective values of acceleration by averaging through the RMS calculation is a sufficient output method in terms of threshold control to avoid the limits of the radio transmission sampling rates, frequency information is lost in the RMS calculation. Accordingly, in the case of analyzing more detailed machining phenomena, insufficient information is present. Meanwhile, in the past, evaluation of the real-time vibrational acceleration in the rotary tools was not conducted in the first place as mentioned above, and it was not until the inventors of the present invention provided the vibration measurement device with a tool holder that the evaluation became possible. At first, it was not even known whether there were machining phenomena that could not be analyzed with the effective values of acceleration averaged by the RMS calculation. Therefore, there may be machining phenomena that are unable to be analyzed and evaluated, and it is considered that potential needs for analyzing the machining phenomena will be large or become larger in the future.

CITATION LIST

Patent Literature

Patent Literature 1: International Publication No. WO 2015-022967
Patent Literature 2: International Publication No. WO 2016-111336
Patent Literature 3: Japanese Patent Laid Open No. 2018-54611

SUMMARY OF INVENTION

Technical Problem

The present invention has been invented in light of the above circumstances, and an object of the present invention is to provide a vibration measurement device that wirelessly transmits a vibration signal, relating to vibrational acceleration of a rotary tool used in rotary machining devices, such as cutting devices and friction stir joining devices, from acceleration sensors, as a waveform signal (high-resolution waveform signal) that is not subjected to averaging within the limits of a radio transmission sampling rate in a sensor-side device and collected at a high sampling rate with frequency information not removed.

Solution to Problem

A vibration measurement device for a rotary tool held by a tool holder that is coupled with a spindle and axially rotates in cooperation with the spindle includes: a pair of acceleration sensors attached to a horizontal plane with respect to a rotary axis of a rotary tool in a manner symmetric to the rotary axis; an amplifier circuit that matches impedance of acceleration information from the acceleration sensors and amplifies voltage; a low-pass filter that removes predetermined high frequencies from an output signal of the amplifier circuit; a subtraction circuit and an addition circuit that output a parallel vibration signal in an XY direction and a vibration signal in a rotational direction, respectively, from the output signal of the low pass filter; a radio transmitter/receiver on an acceleration sensor side (including a radio microcontroller (sensor side) 22 and a radio transmitter/receiver 23) that transmits the parallel vibration signal in the XY direction and the vibration signal in the rotational direction to an outside; an external radio transmitter/receiver (including a radio transmitter/receiver 24, a radio microcontroller (PC side) 25, a personal computer 27 and an audio input/output device 26) that receives the vibration signals transmitted from the radio transmitter/receiver on the sensor side and displays and/or records the vibration signals in real time.

The radio transmitter/receiver on the acceleration sensor side performs A/D conversion of output signals of a high-resolution waveform including frequency information from the subtraction circuit and the addition circuit, processes the output signals as transmission data, and transmits the output signals without further processing to the outside.

In the past, due to the limits of radio transmission sampling rates on a sensor side device, such as the tool holder, as discussed above, a method of outputting effective values of acceleration by averaging vibration signals from an acceleration sensor through RMS calculation and transmitting the effective values to the outside was adopted. However, the vibration measurement device of the present invention is configured to wirelessly transmit a waveform signal (high-resolution waveform signal) that is not subjected to averaging through RMS calculation and collected at a high sampling rate with frequency information not removed. This makes it possible to analyze machining phenomena that could not be analyzed with the effective values of acceleration averaged by the RMS calculation.

The external radio transmitter/receiver may preferably display and/or record the output signals of a high-resolution waveform received from the radio transmitter/receiver on the sensor side in real time without further processing and after fast Fourier transform.

The external radio transmitter/receiver (external personal computer 27 in particular) of the vibration measurement device can display a high-resolution waveform transmitted from the radio transmitter/receiver on the sensor side, which is a waveform collected at a high sampling rate, and a waveform obtained by applying fast Fourier transform (FFT transformation) to the high-resolution waveform. Accordingly, a characteristic peak or the like, which cannot be detected with only the high-resolution waveform, can be detected based on frequency information included in the output signal of the high-resolution waveform by applying FFT transform, so that various high-level analysis can be performed. For example, so-called "chattering" based on the influence of bending natural frequency of a rotary spindle that cannot be detected from the display of the high-resolution waveform can be detected in real time.

The external radio transmitter/receiver may display and/or record the output signals of a high-resolution waveform received from the radio transmitter/receiver on the sensor side in real time without further processing and after auto-correlation processing.

In the above example, even when no difference is detected with only the vibration signal of a high-resolution waveform, a difference is detected with the signal data subjected to FFT transform, and therefore an example that enables abnormality detection is proposed. In the vibration measurement device, an example of autocorrelation processing is proposed. The autocorrelation processing is a process for calculating a correlation coefficient of original signal data with a copy of the original signal data with time lag from the original signal data, and the autocorrelation processing indicates relationship between the time lag from the original signal data and the calculated correlation coefficient. For example, when a blade of a cutter having more than one blade is damaged, it is known that there is a large difference between a correlation coefficient of the frequency of the damaged blade and a correlation coefficient of the frequency of normal blades.

A vibration detector of the present invention may include: filter means for extracting only an output signal of a specific frequency domain out of output signals that are vibration signals output in real time during machining from acceleration sensors attached to a rotary tool held in a tool holder that is coupled with a spindle and axially rotates in cooperation with the spindle, the output signals being not subjected to averaging and collected at a high sampling rate with frequency information not removed; and averaging means for averaging and outputting the output signal extracted by the filter means.

As discussed above, in the case of detecting a high-resolution waveform that is a waveform not subjected to averaging, such as typical RMS calculation, and collected at a high sampling rate with frequency information not removed, output information that cannot be detected in the case of performing the RMS processing can also be detected, so that the machining phenomena can be analyzed in more detail. However, the high-resolution waveform may also contain unwanted output signals such as noise in a predetermined frequency domain, and this may interfere with the analysis of machining phenomena. The vibration detector has the filter means for removing the frequency domain containing the unwanted output signals in the stage of a high-resolution waveform and extracting only the frequency domain required for analysis of the machining phenomena, which makes it possible to apply the RMS processing to filtered data and output the data. Under predetermined machining conditions, when a machining phenomenon desired to be detected, such as the presence of a defect, affects a specific frequency domain, it is possible to detect the machining phenomenon in real time during machining, and therefore various analyses can be performed in response to user's requirements.

Furthermore, the specific frequency domain subjected to extraction in the filter means may preferably be a frequency domain determined to be necessary based on an output signal obtained by applying fast Fourier transform to an output signal of a high-resolution waveform.

In the example of the vibration detection means, it was found out that the unwanted domain may be clarified once the fast Fourier transform is performed as a method for finding an unwanted frequency domain in the high-resolution waveform that is removed by the filter means for detailed analysis of the machining phenomena. In this case, it is desirable to remove the unwanted frequency domain detected by the fast Fourier transform, and then to perform averaging such as the RMS processing.

Advantageous Effects of Invention

As described in the foregoing, the vibration measurement device of the present invention wirelessly transmits a high-resolution waveform signal that is a vibration signal from acceleration sensors relating to vibrational acceleration of a rotary tool or the like, the vibration signal being not subjected to averaging within the limits of a radio transmission sampling rate in a sensor-side device and collected as a waveform at a high sampling rate with frequency information not removed, and displays the output signal on the external personal computer that has received the output signal. Accordingly, it is possible to perform advanced analysis of the machining state in real time, which was not possible in the past. Furthermore, the external personal computer or the like can display the output signal of a high-resolution waveform subjected to processing and calculation according to other methods, and even more advanced analysis, which could not be achieved by analysis and detection based on the high-resolution waveform, can be implemented in real time.

Furthermore, in the vibration measurement device of the present invention, in the case where detailed analysis of the machining phenomena is not possible by simply detecting the high-resolution waveform which is a raw collected waveform, as it is, without averaging such as the typical RMS processing, it is also possible to detect only the machining phenomenon desired to be detected by removing the frequency domain containing unwanted output signals in the stage of a high-resolution waveform and extracting only the frequency domain required for analysis of the machining phenomenon in real time. As a result, various analysis can be performed in response to user's requirements.

BRIEF DESCRIPTION OF DRAWINGS

FIG. 1A shows a photograph view of a tool holder unit including a vibration measurement device of the present invention in the state of being held by a rotary spindle of a machining center, and FIG. 1B shows a photograph illustrating an external terminal that receives and analyzes data from the tool holder unit in FIG. 1A.

DESCRIPTION OF EMBODIMENT

<<Device Configuration Example>>

Figure 1A:
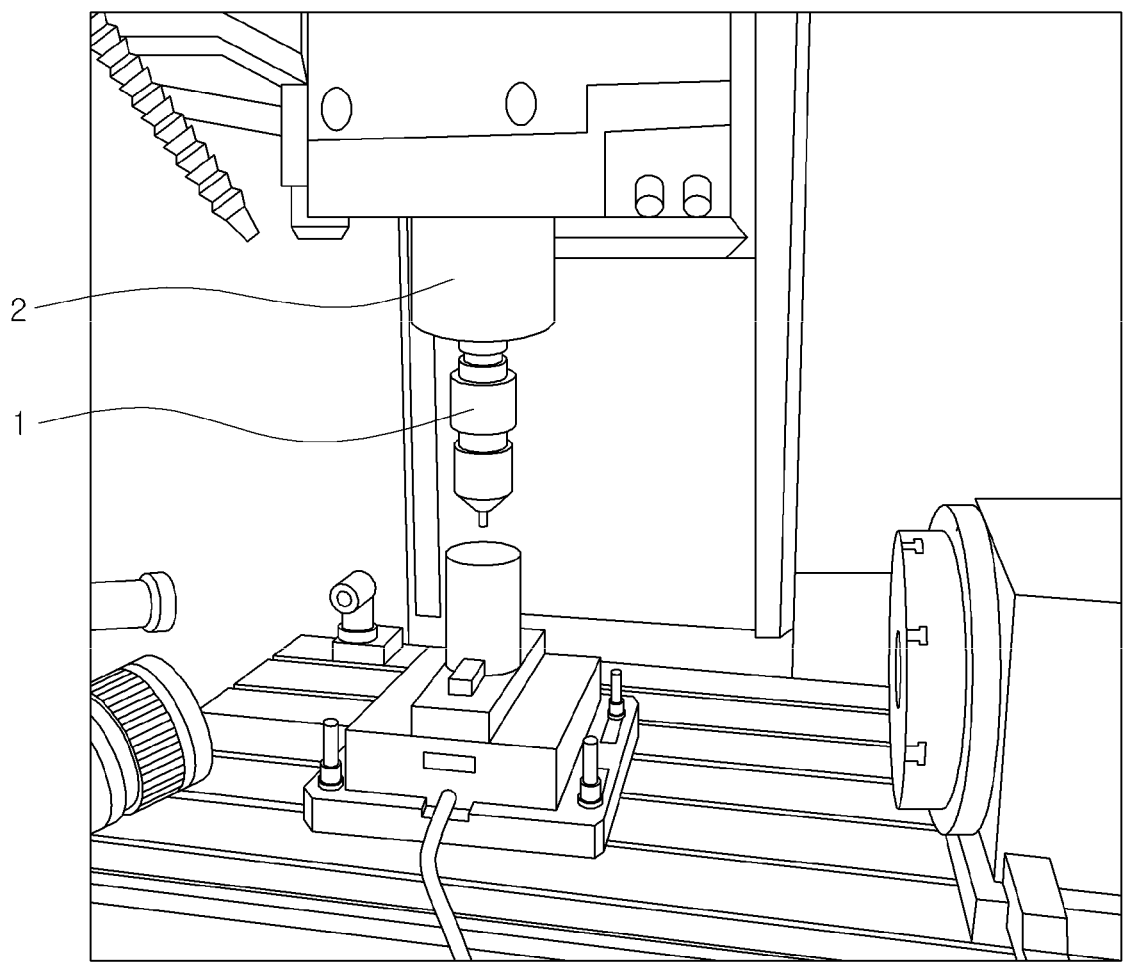
FIGS. 1A-1B.

FIG. 1A shows a photograph view of a tool holder unit 1 including a vibration measurement device of the present invention in the state of being held by a rotary spindle 2 of a machining center. The tool holder unit 1 has an upper part held by the rotary spindle 2 and a lower part to hold a tool like a typical tool holder. Unlike the typical tool holder, the tool holder unit 1 is formed as a unit having a function to be able to detect in real time the state in the vicinity of a tool during machining.

Specifically, the tool holder unit 1 measures vibration or the like of the tool during machining, digitizes measured data, transmits the data to the outside, and uses an external terminal to receive and analyze the transmitted data.

Figure 1B:
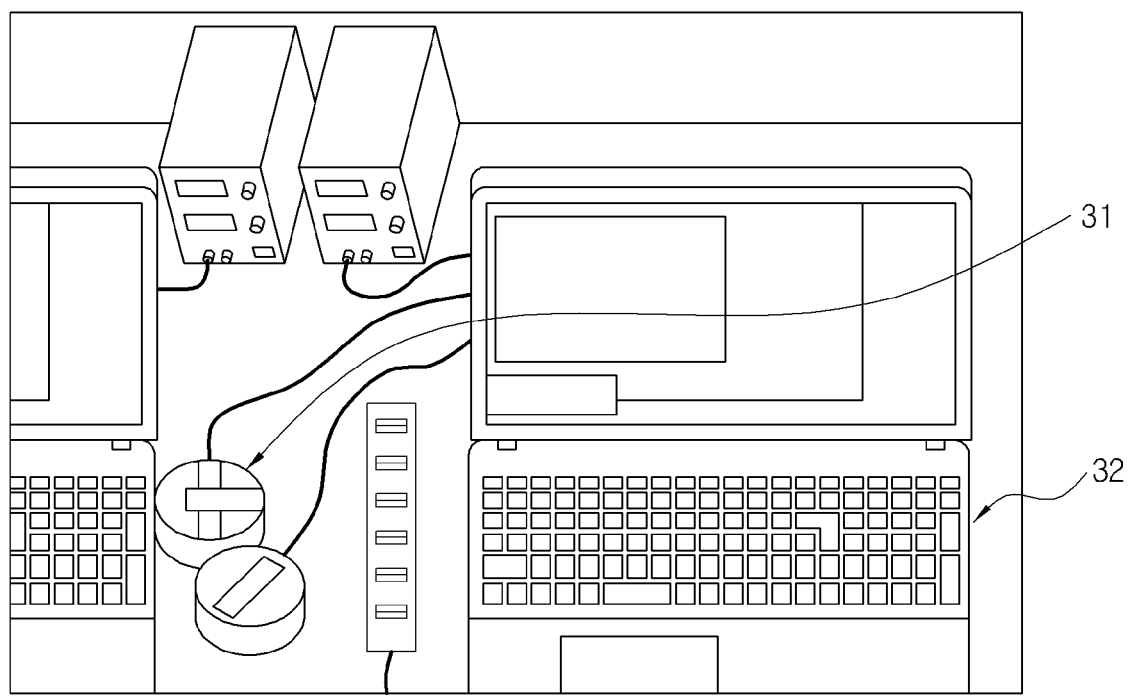

FIG. 1B shows a photograph illustrating the external terminal that receives and analyzes the data from the tool holder unit 1 in FIG. 1A. A receiver 31 receives the digital data from the tool holder unit 1 and transmits the digital data to a personal computer 32. Upon reception of the data transmitted from the receiver 31, the personal computer 32 processes (or calculates) the data with internal dedicated software, and displays an obtained result on a display.

<<Configuration of Tool Holder Unit and Mounting Position of Acceleration Sensors>>

Figure 2:
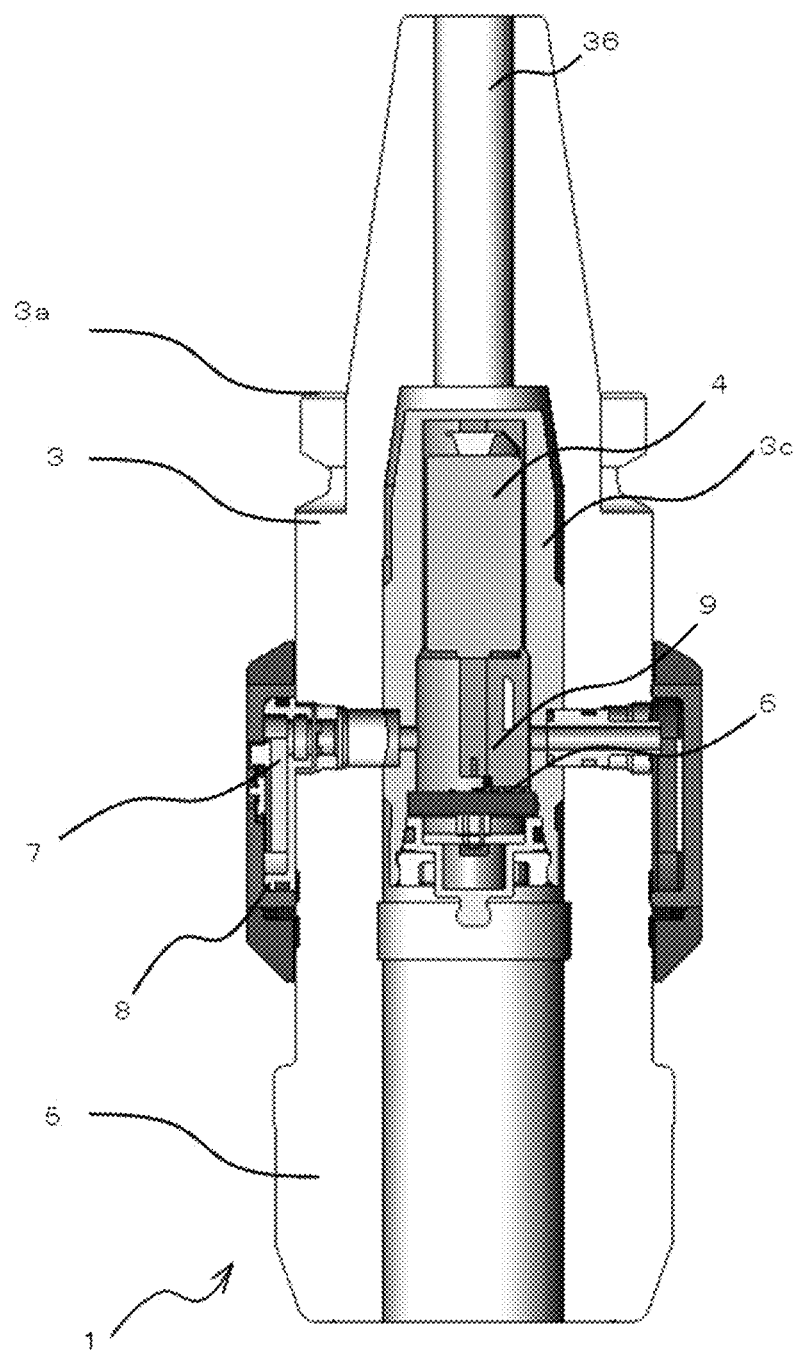
FIG. 2 shows a longitudinal section view of the tool holder unit.

FIG. 2 shows a longitudinal section view of the tool holder unit 1. In FIG. 2, the upper side of the page corresponds to the side of the rotary spindle 2, and the lower side corresponds to the side of a cutting tool. A portion of the tool holder unit 1 above a flange part 3a is inserted into the rotary spindle 2 so that the tool holder unit 1 is held by the rotary spindle 2 and rotates in cooperation with the rotary spindle 2. The tool holder unit 1 has a hollow inside, and a chuck 5 for holding a tool is fixed at a lower part. Above the chuck 5, a clearance 3c is provided for arrangement of components, and a battery 4 is disposed in the clearance 3c. This battery 4 may be rechargeable. Data from various sensors are subjected to A/D conversion on a control board 9 disposed in the clearance 3c, and are transmitted from a radio transmission device 7 on the side of an outer circumferential portion of a tool holder body 3 which is connected via a through hole.

Note that the data from various sensors may be subjected to A/D conversion on a control board in the outer circumferential portion of the tool holder body 3.

As the various sensors, examples of temperature measurement using thermocouples disposed inside the tool have already been developed. However, acceleration sensors are used for detecting vibration of a cutting tool or the like, which is the main purpose of the present invention. Examples of disposition of acceleration sensors will be described. The example in FIG. 2 shows an example in which sensors are provided at lowermost positions of the clearance 3c in order to capture the vibration at a cutting point more accurately. Here, a battery of a large capacity is housed on the side closer to the rotary spindle 2 (upper side of the page of FIG. 2) than acceleration sensors 6 in one example. Hereinafter, examples of the arrangement position of the acceleration sensors 6 will be described.

Figures 3A, 3B, 3C, 3D, 3E, 3F:
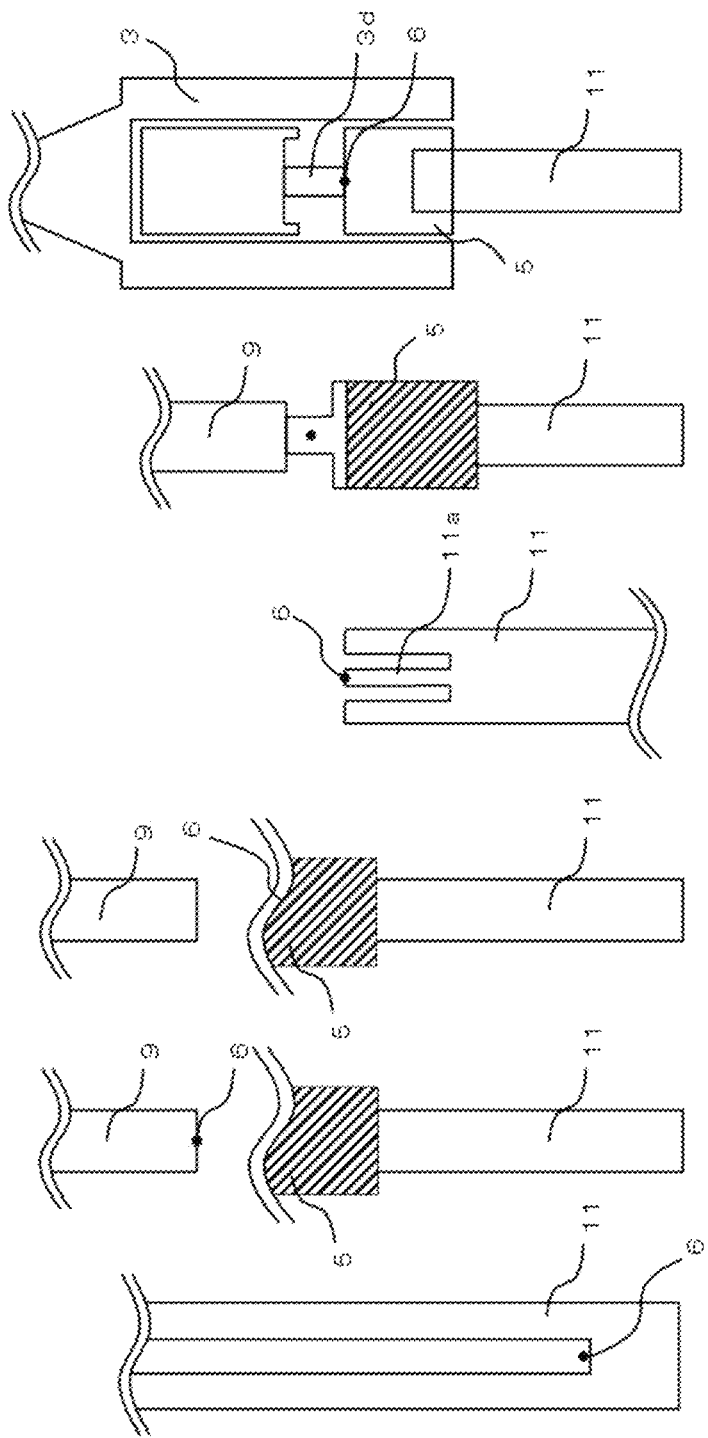
FIGS. 3A-3F are schematic diagrams showing six arrangement positions of acceleration sensors.

FIGS. 3A-3F are schematic diagrams showing six arrangement positions of the acceleration sensors 6. FIG. 3B shows the example of arranging the acceleration sensors 6 in the vicinity of a rear end of a tool 11 in FIG. 2 described above. In addition, as an example similar to the method used to measure tool vibration, the acceleration sensors 6 are attached to a tip (lower end) of a hollow part of the tool 11 in FIG. 3A, and the acceleration sensors 6 are attached to the rear end (upper end) of the tool 11 in FIG. 3C. In FIG. 3D, a cantilever 11a for amplifying vibration amplitude is formed on the rear end (upper end) of the tool 11, and the acceleration sensors 6 are attached to the tip (upper end) of the cantilever 11a. In FIG. 3E, the acceleration sensors 6 are attached to the tip (upper end) of the chuck 5 of the tool. FIG. 3F shows an example in which a cantilever 3e or a component similar thereto is formed in the clearance 3c inside the tool holder body 3 to amplify the vibration amplitude, and the acceleration sensors 6 are attached to the tip of the cantilever 3e or the component similar thereto.

<<Acceleration Detection Direction>>

Figure 4:
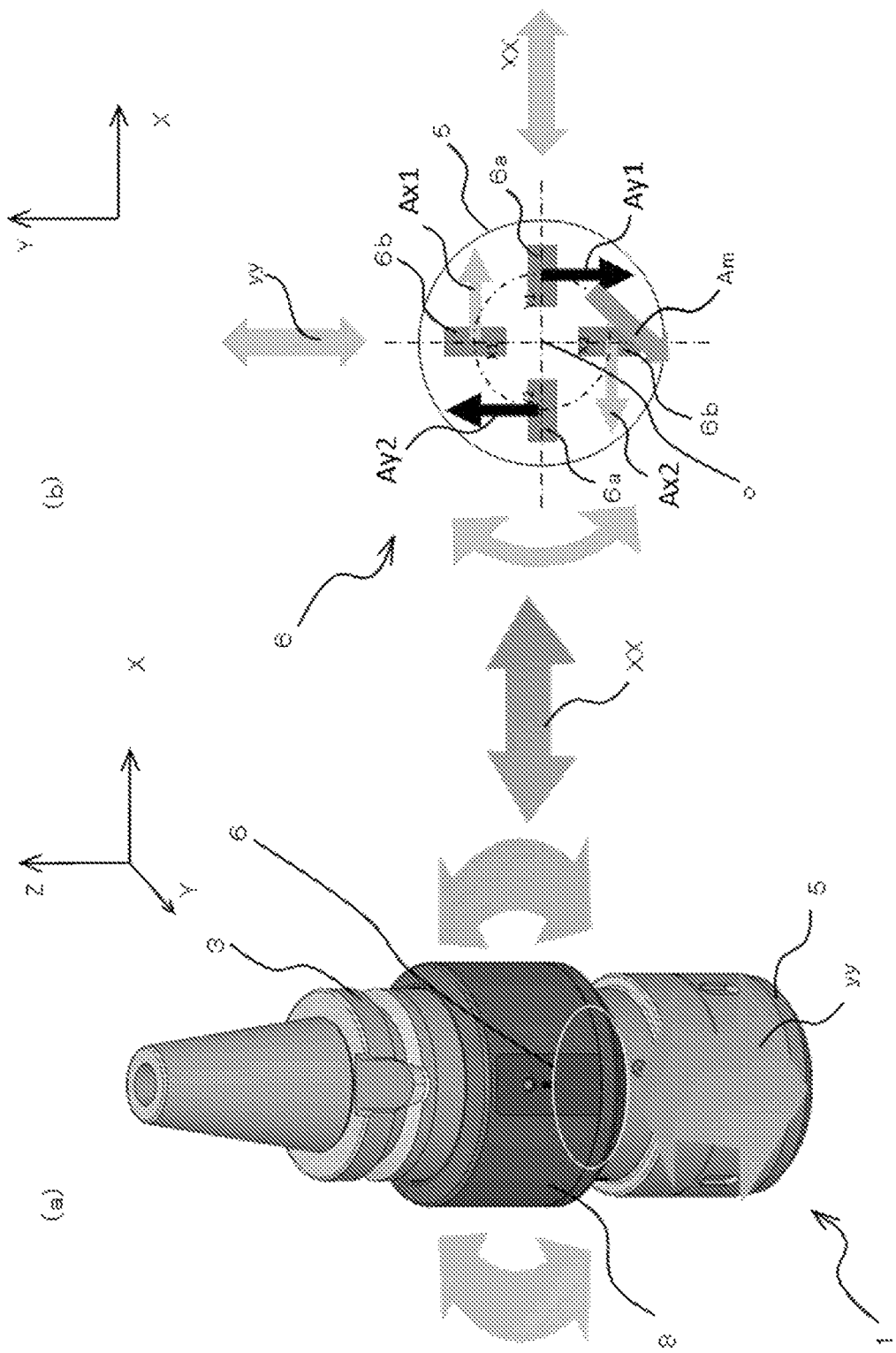
In FIG. 4, (a) is a perspective view of the tool holder unit, and (b) shows the arrangement positions of the acceleration sensors on a section view along a direction perpendicular to the axis at the positions for disposing the acceleration sensors in (a) of FIG. 4.

In FIG. 4, (a) shows a perspective view of the tool holder unit 1, and (b) shows an arrangement relation of the acceleration sensors 6 (at positions of reference numeral 6) on a section view along a direction perpendicular to the axis at the positions for disposing the acceleration sensors 6 in (a) of FIG. 4. In FIG. 4, an X direction is one of any lateral directions axially perpendicular to the tool holder body 3 as shown by each arrow xx, and a Y direction is a direction rotated 90° around the axis from each arrow xx as shown by each arrow yy. The acceleration sensors 6 shown here are piezoelectric acceleration sensors, which are two pairs of sensors at opposite positions around a rotation axis O, the two pairs being disposed orthogonally in the X direction and the Y direction, respectively.

Specifically, as shown in (b) of FIG. 4, the acceleration sensors 6 are at least two pairs of sensors (four sensors) disposed on the same plane horizontal (vertical) to the rotation axis. The acceleration sensors 6a in one pair are disposed facing the center O of an axial line along the X direction (in the direction of the arrow xx) at positions with the same distance from the center O of the axial line so as to have sensitivity opposite to the Y direction. The acceleration sensors 6b, 6b in the other pair are also disposed facing the center O along the Y direction (in the direction of the arrow yy) at positions with the same distance from the center O so as to have sensitivity opposite to the X direction.

Here, the individual sensors of the two pairs of acceleration sensors 6a, 6b are expressed by Y1, Y2, X1, and X2 in (b) of FIG. 4, respectively. From acceleration Ay1, Ay2, Ax1, and Ax2 (see arrows) in the Y direction and the X direction in the respective sensors 6a (Y1), 6a(Y2), 6b(X1), and 6b(X2), acceleration Ax in the X direction, acceleration Ay in the Y direction, acceleration Am' in a tangential direction, and angular acceleration Am in the tangential direction of the chuck 5 at the arrangement position of the acceleration sensors 6 can be calculated as follows.

$Ax=(Ax1-Ax2)/2$ $Ay=(Ay1-Ay2)/2$ $Am'=(Ax1+Ax2)/2$ $Am[\text{rev.}/s^2]=Am'[m/s^2]/(\text{diameter}[mm]\times 10^{-3}\times\pi)[m]$ $Am[\text{rad}/s^2]=Am'[m/s^2]/(\text{diameter}[mm]\times 10^{-3}/2)[m]$ Therefore, when the acceleration sensors 6 are arranged symmetrically to the rotation axis O, it becomes clear that the acceleration in both the horizontal (x,y) and rotational directions can be detected.

<<Relationship Between Machining and Acceleration>>

Figure 5:
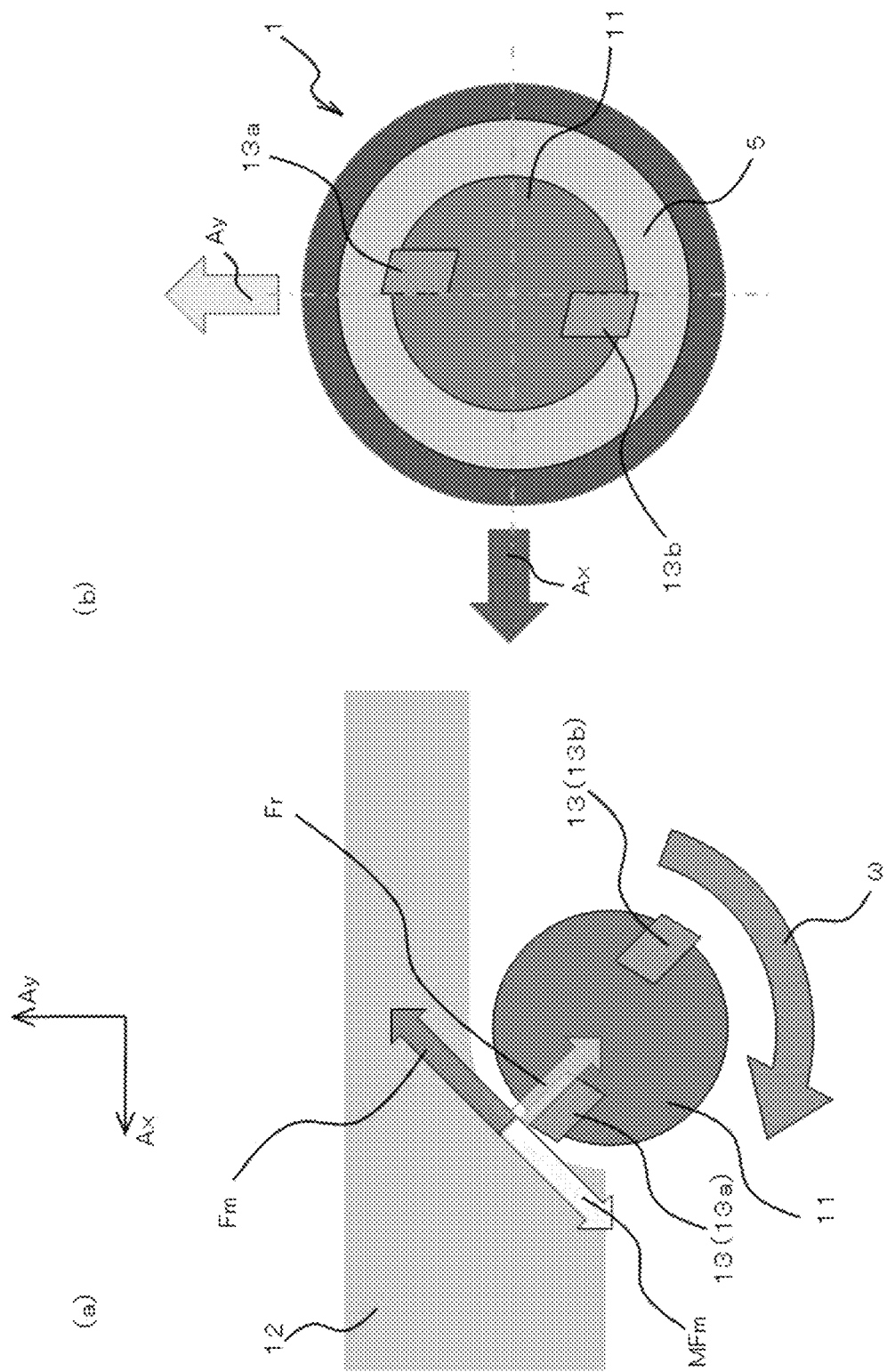
In FIG. 5, (a) shows the relationship between load generated during cutting a workpiece and acceleration, and (b) shows the acceleration viewed from the tool.

In FIG. 5, (a) shows the relationship between load generated during cutting of a workpiece (work) 12 and acceleration, and (b) shows the acceleration viewed from the cutter (tool) 11. As shown in (a) of FIG. 5, a chip 13 cuts and grinds the workpiece 12 when the cutter 11 advances to the left side of the page while rotating in a rotational direction W of the cutter 11. In this case, at the point of contact (cutting point) between the chip 13a and the workpiece 12, load is applied to the rear of the cutter 11 (i.e., ahead of the tangent), and fractional force of the load in the tangential direction is expressed by Fm and fractional force in a normal direction is expressed by Fr as shown in (a) of FIG. 5. In accordance with the fractional force Fr, dynamic friction force further acts as MFm in the opposite direction of the fractional force Fm.

When such force acts on the chip 13, acceleration is applied to the cutter 11, and further to the tool holder unit 1 (chuck 5). Therefore, when the acceleration sensors 6a and 6b as described above in (b) of FIG. 4 are provided, and the acceleration in the X and Y directions is measured, it becomes clear how much acceleration is applied in the X, Y, and rotational directions. As a result, vibration measurement also becomes possible.

<<Flow of Vibration Measurement Signal (Example of Outputting and Performing RMS Calculation and Example of Outputting High-Resolution Waveform Data without RMS Calculation)>>

Figure 6:
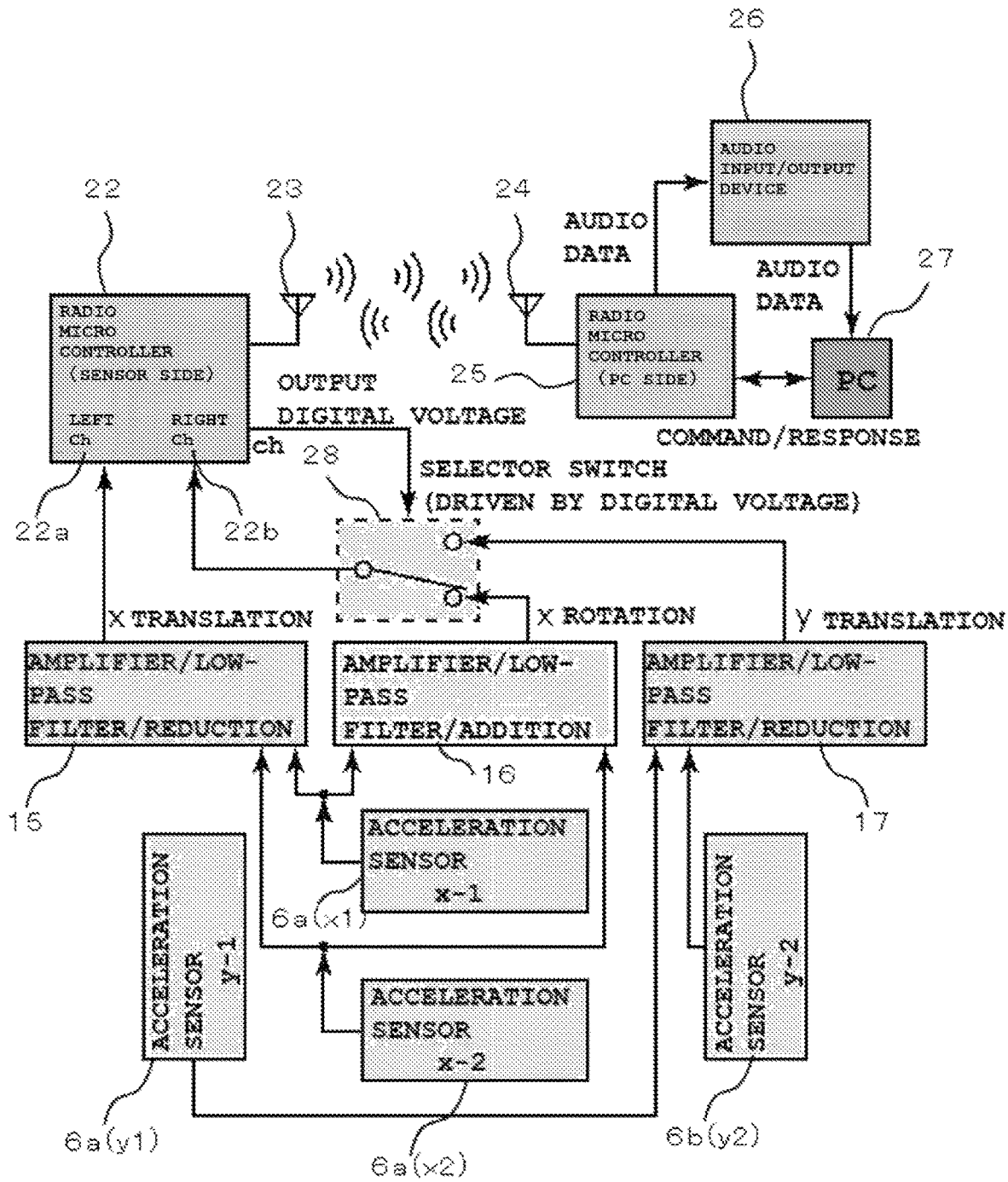
FIG. 6 shows a block diagram depicting an example of vibration measurement in which the vibration measurement device outputs high-resolution waveforms without performing RMS calculating (averaging) and transmits the high-resolution waveform to the outside.

FIG. 6 shows a block diagram indicating that the vibration measurement device measures vibration and outputs high-resolution waveform data. First of all, in the example of FIG. 6, in the tool holder body 3, the acceleration sensors 6a(y1), 6a(y2), 6b(x1), and 6a(x2) output vibration information in analog signals, and through an amplification circuit, a low-pass filter, and a subtraction (or addition) circuit (see signs 15, 16, and 17), translational vibration signals and a rotational vibration signal are output.

Specifically, the amplifier circuit that is the circuit 17 performs impedance matching of the analog signals from the acceleration sensors 6a(y1) and 6a(y2), voltage amplification, and gain adjustment according to a post-stage circuit. To avoid influence of resonant frequency of the acceleration sensors 6a(y1) and 6a(y2), the low-pass filter cuts a high frequency component of the output signal from the amplifier circuit, and outputs a resultant signal. The signal transmitted from the low-pass filter is also amplified by an operational amplifier or the like. Then, in the subtraction circuit (differential amplification circuit), a voltage is output which is a prescribed multiple of voltage difference from the acceleration sensors 6a(y1) and 6a(y2), i.e., a parallel vibration (y-translation) signal in the Y direction is output. Similarly, in the circuit 15, the analog signals from the acceleration sensors 6b(x1) and 6a(x2) are made to pass through the amplification circuit, the low-pass filter, and the subtraction circuit, and are output as a parallel vibration (x-translation) signal in the X direction.

Similarly, in the circuit 16 as in the circuit 15, the analog signals from the acceleration sensors 6a(x1) and 6a(x2) are output through the amplification circuit and the low-pass filter, and then in the addition circuit, a voltage is output which is a sum of prescribed multiples of voltages from the respective acceleration sensors 6a(x1) and 6a(x2), i.e., a voltage as a vibration (x-rotation) signal in the rotational direction.

The x-translation signal, the x-rotation signal, and a y-translation signal output from the circuits 15 to 17 are not subjected to averaging by RMS calculation or the like, and after passing through a bypass filter and an A/D converter not illustrated, the signals are output as digital signals with a high sampling rate being maintained.

The output digital signals are converted into transmission data by a radio microcontroller 22 (sensor side) in the tool holder body 3 and transmitted to the outside by the radio transmitter/receiver 23. The radio microcontroller 22 has input terminals corresponding to two channels including a left ch22a and a right ch22b. The circuits 15, 16 and 17 are connected to the left ch22a, the right ch22b, and the right ch22b, respectively, via a selector switch 28, and receives the x-translation signal, the x-rotation signal, and the y-translation signals, which are vibration signals (high-resolution waveform signals) at a high sampling rate. The vibration information (x-translation signal, x-rotation signal, and y-translation signal as vibration data) received by the radio microcontroller 22 is wirelessly transmitted to the outside by the radio transmitter/receiver 23. In this example, the input terminals of the radio microcontroller 22 correspond to two channels, and two of the circuits 15, 16, and 17 are connected via the selector switch 28 to the left ch22a and the right ch22b. However, when the input terminals correspond to three channels, it is conceivable that the circuits 15, 16, and 17 are connected to three channels without via the selector switch, and the radio microcontroller 22 receives the x-translation signal, the x-rotation signal, and the y-translation signal which are vibration signals of a high-resolution waveform at a high sampling rate.

The vibration information (x-translation signal, x-rotation signal, and y-translation signal) wirelessly transmitted are received by the external radio receiver 24, processed by the personal computer 27 installed with dedicated software via a serial USB converter of the radio microcontroller 25 (PC side), and displayed on a display of the personal computer 27. The radio microcontroller 25 also transmits the x-translation signal, x-rotation signal, and y-translation signals that are vibration data of a high-resolution waveform to the audio input/output device (such as a headphone and a speaker) 26 to reproduce the data on the device 26. The audio input/output device 26 then transmits the audio data to the personal computer 27, where the audio data is recorded.
<<Flow of Vibration Measurement Signal (Example of Command to Start and Stop Transmission of Waveform Data from External Personal Computer to Acceleration Sensor Side>>

The radio microcontroller 25 on the personal computer 27 side in FIG. 6 receives a combination of two high-resolution waveforms, out of the x-translation signal, the x-rotation signal and the y-translation signal, since the radio microcontroller 22 on the sensor side has two channels. The personal computer 27 can generate a switching command signal for the selector switch 28 to switch from one combination to another, and wirelessly transmit the command signal to the sensor-side radio microcontroller 22 via the personal computer-side radio microcontroller 25, and the radio transmitter/receivers 23 and 24. The radio microcontroller 22 on the sensor side that has received the command signal outputs a digital voltage to drive the selector switch 28 that is driven by the digital voltage, and switches the left ch22a and the right ch22b connected to the circuits 15, 16, and 17.

Example 1 (Search for Optimum Machining Condition)

The vibration measurement device can detect abnormal vibrations of the tool 11 during machining, and can also detect occurrence of unstable cutting (so-called "chattering") during cutting, which is a serious sign of tool breakage. In the past, when the occurrence of "chattering" was recognized by visual inspection, noise, or abnormal signals of the device, a cutting amount to the workpiece 12 or rotational speed was reduced in order to cope with the occurrence. However, by utilizing the vibration measurement device, it is possible to detect regions where "chattering" does not occur even when the cutting amount or rotational speed increases, instead of simply reducing the cutting amount or the rotational speed.

Figure 7:
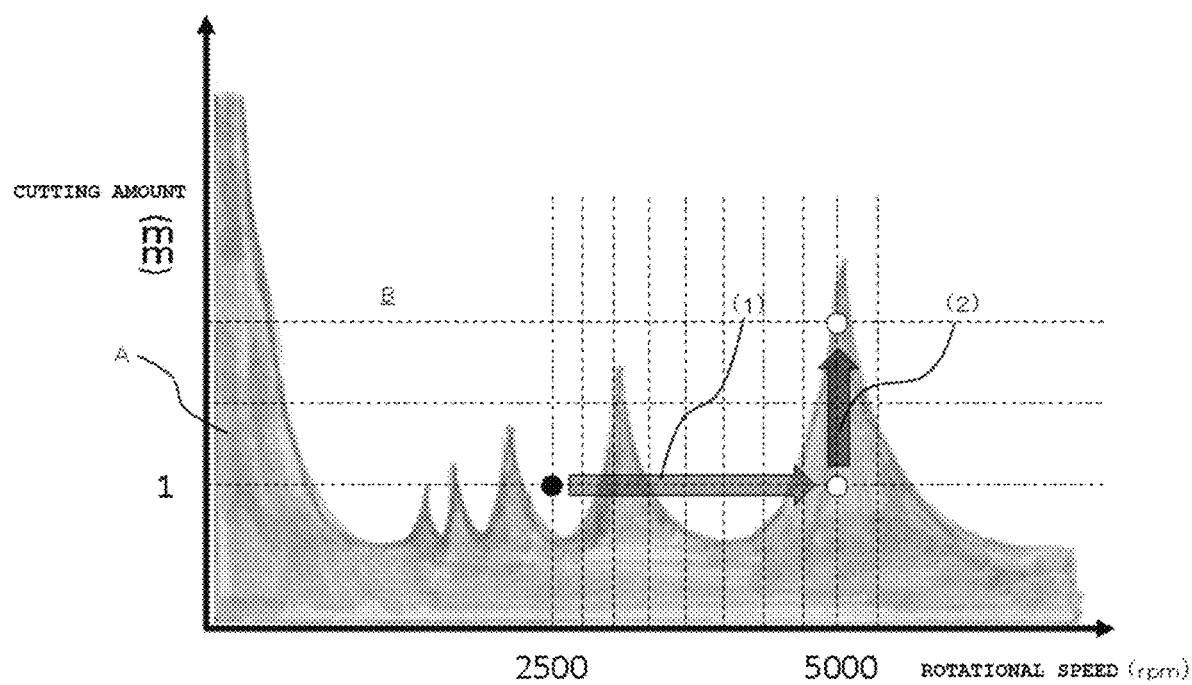
FIG. 7 is a graph diagram showing a utilization example 1 (Example 1) of a measurement result of tool vibration using output signals shown in FIG. 6.

FIG. 7 is a graph diagram showing a utilization example 1 of a measurement result of vibration of the tool 11 by the vibration measurement device. FIG. 7 shows an unstable cutting region (white region A) and a stable cutting region (gray region B), with the cutting amount (mm) to the workpiece 12 as a vertical axis and the rotational speed (rpm) of the tool 11 as the horizontal axis. The unstable cutting region (white region A) and the stable cutting region (gray region B) vary according to conditions of the tool 11, the workpiece 12, etc. Although there have been academic examples of the regions, they fail to provide specific definition for individual tools 11 that are actual targets of vibration measurement.

However, for example, when the rotational speed is 2500 rpm and the cutting amount is 1 mm for a case where "chattering" is actually detected as shown by a black circle mark, it is clear that "chattering" is caused by rotation of the tool 11 in the stable cutting region B (because "chattering" is actually detected). By verifying whether "chattering" occurs from this state with the vibration measurement device while increasing the rotational speed, it is possible to search for a condition that does not cause "chattering" even under the condition of more high-speed rotation as shown by an arrow (1). In the example of FIG. 7, it would be understood that the search verifies that "chattering" is once lost around 2700 rpm, then "chattering" occurs again, and "chattering" is lost again in the vicinity of 5000 rpm.

By verifying whether "chattering" occurs from this state with the vibration measurement device while increasing the cutting amount, it is possible to search for a limit point where "chattering" does not occur even under the condition of a higher cutting as shown by an arrow (2). In the example shown in FIG. 7, the search may verify that the cutting amount of about 3 mm (white circle mark on the upper side) is the limit point where "chattering" does not occur. By searchingly measuring a plurality of vibration abnormalities during machining with the vibration measurement device in this way, the stable cutting region A under severe conditions that were unable to be verified in the past can be detected, and rapid machining can easily be achieved while avoiding breakage of the tool 11.

Example 2: Cutting Example

Setting and Cutting Conditions

Figure 8:
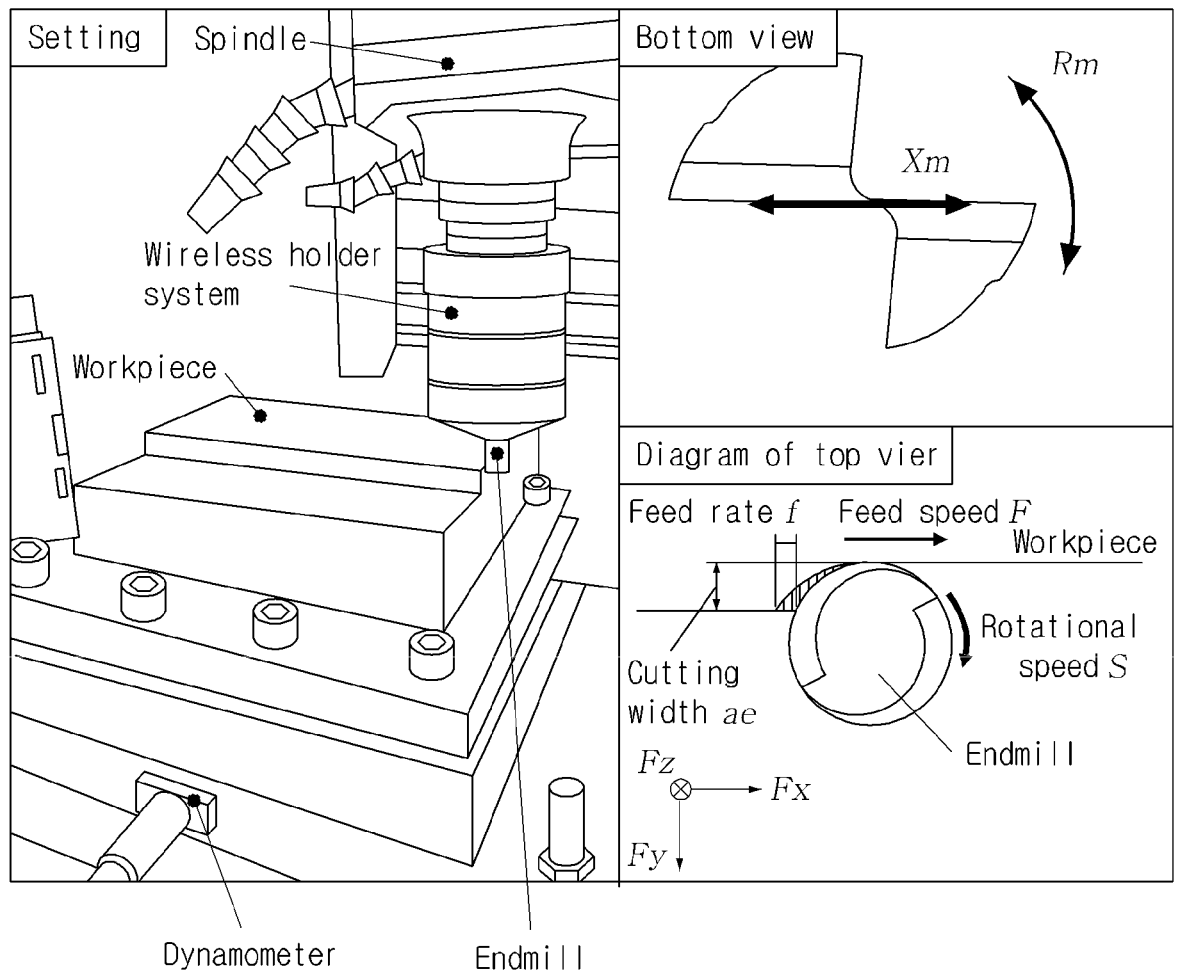
FIG. 8 is a schematic diagram showing a setup of an experimental example 2 and a photograph view showing the relationship between an end mill edge and a tool rotation coordinate system.

FIG. 8 shows a schematic diagram of the setup of an experiment and the relationship between an end mill edge and a tool rotation coordinate system. A spindle taper of a vertical machining center was BT40, and an end mill was held by the spindle with a holder system of the present invention. The used end mill was a cemented carbide end mill of ϕ 10 mm having two blades with a blade length of 20 mm and a twist angle of 30°. At that time, the end mill was held so that a cutting edge of the end mill and an Xm axis of the tool rotation coordinate system were parallel. As a cut material, S50C was used, and fixed onto a piezoelectric cutting power meter (9255B made by Kistler) that was installed on the table of a machining center. Sensitivity directions X, Y, and Z of the cutting resistance are shown as Fx, Fy, and Fz in a schematic top view in FIG. 8. Down-cut to the cut material was performed with one side of the cut material being set as a pass, and a cut length at the tool center in the experiment was 200 mm in the X direction. As the cutting conditions, a one-blade feed amount was fixed to 0.06 mm/tooth, and machining was performed by increasing the rotational speed by 50 rpm from 1500 rpm to 3000 rpm whenever the center of the tool moved about 5 mm. The cross-cutting amount was 0.4 mm in a radial direction, 10 mm in an axial direction, and a tool protrusion amount was L/D=3.3. The experiment was performed in dry without using coolant.

Monitoring Method of High-Resolution Waveforms of Vibrational Acceleration

For vibrational acceleration during machining, four acceleration sensors with sensitivity in one axis direction were arranged in the holder at equal intervals on an axis Xm of the rotation coordinate system at a distance of 5 mm from the center of rotation in the radial direction (86 mm from the gauge line) so as to have the sensitivity in the rotational direction. The acceleration ax1 and ax2 of the respective sensors have + sensitivity in the direction of the arrows shown in the drawing, and acceleration in the Xm direction can be calculated by differential calculation of the vibrational acceleration by (ax1−ax2)/2. The acceleration in the Rm direction, which indicates the direction of rotation, can be calculated by addition calculation by (ay1+ay2)/2. Therefore, it is possible to monitor the vibrational acceleration in total two directions: translational and rotational directions of the tool. The natural frequency of the sensor used here was 20 kHz. In addition, an amplifier, an A/D converter, a microcontroller, and a radio transmitter were disposed. The acceleration was subjected to analog calculation processing in the microcontroller to compress information, and then subjected to A/D conversion, and the obtained result was transmitted at a radio transmission sampling rate of 44.1 kHz, so that the personal computer connected to the receiver could display and record the measurement result in real time.

Experiment Results and Remarks

Figure 9A:
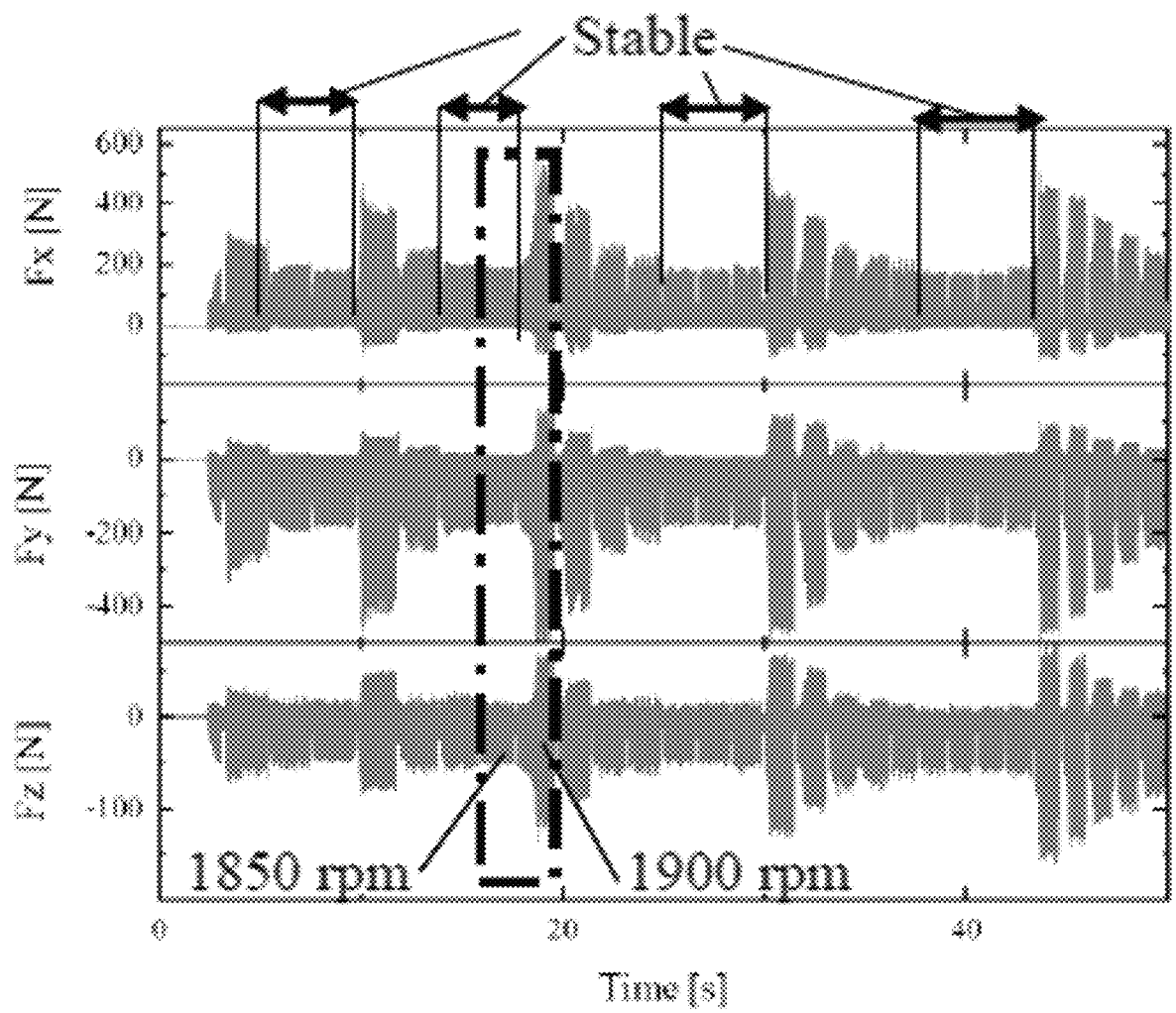
FIGS. 9A-9B show the result of monitoring high-resolution waveforms of vibrational acceleration in the experimental example 2.
Figure 9B:
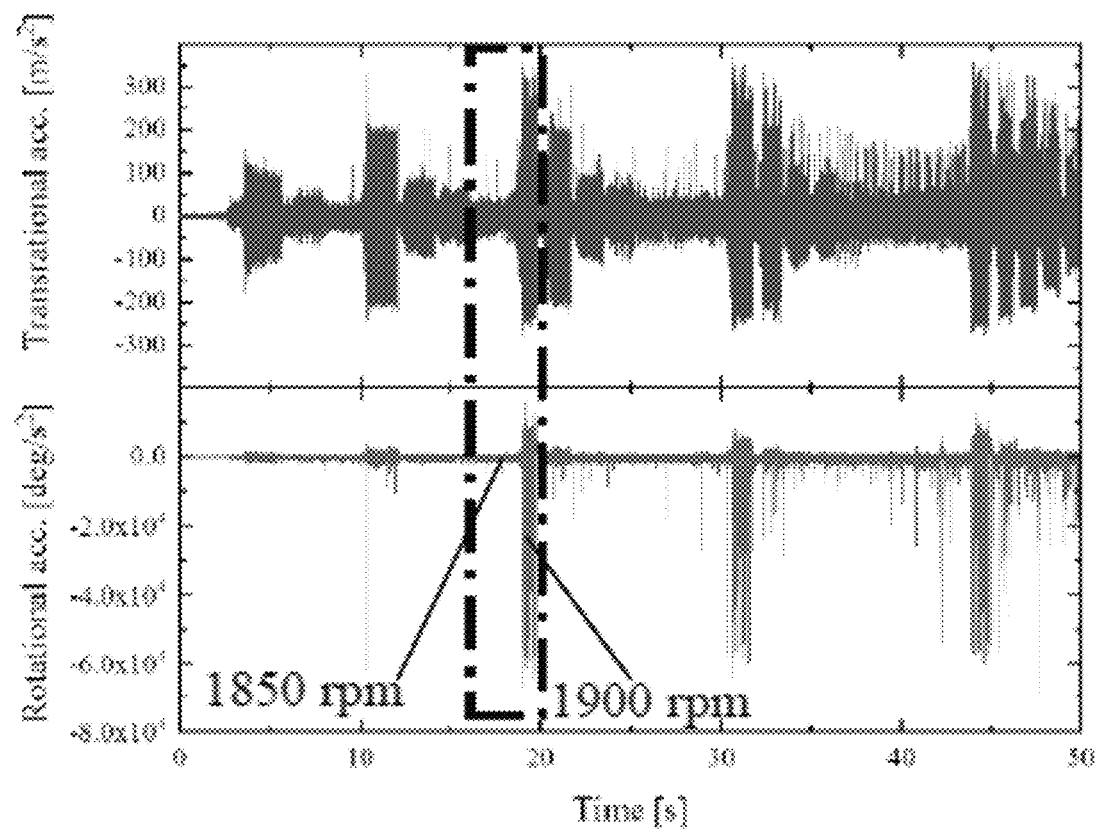
Figure 10A:
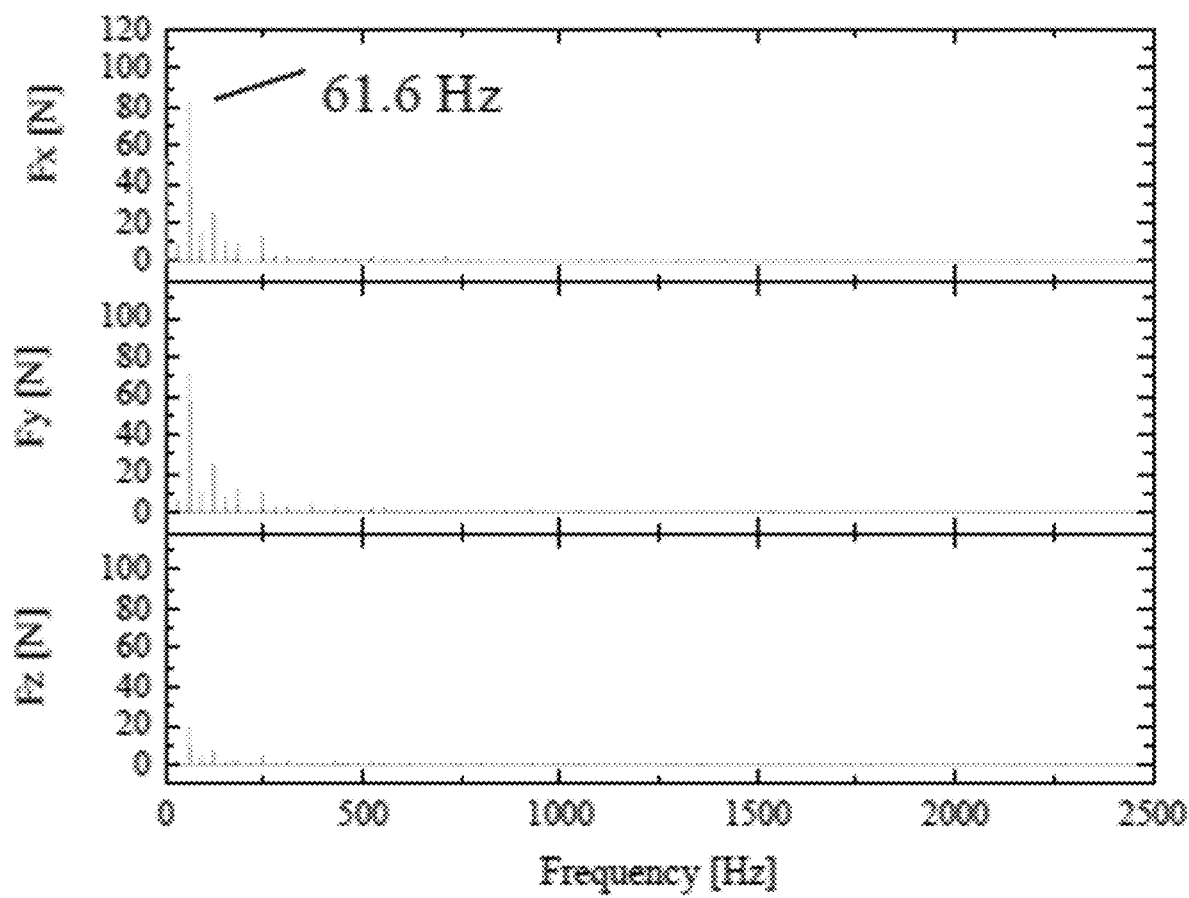
FIGS. 10A-10B show the result of FFT analysis of both physical quantities by focusing on the rotational speed of 1850 rpm during stable machining in the experimental example 2.
Figure 10B:
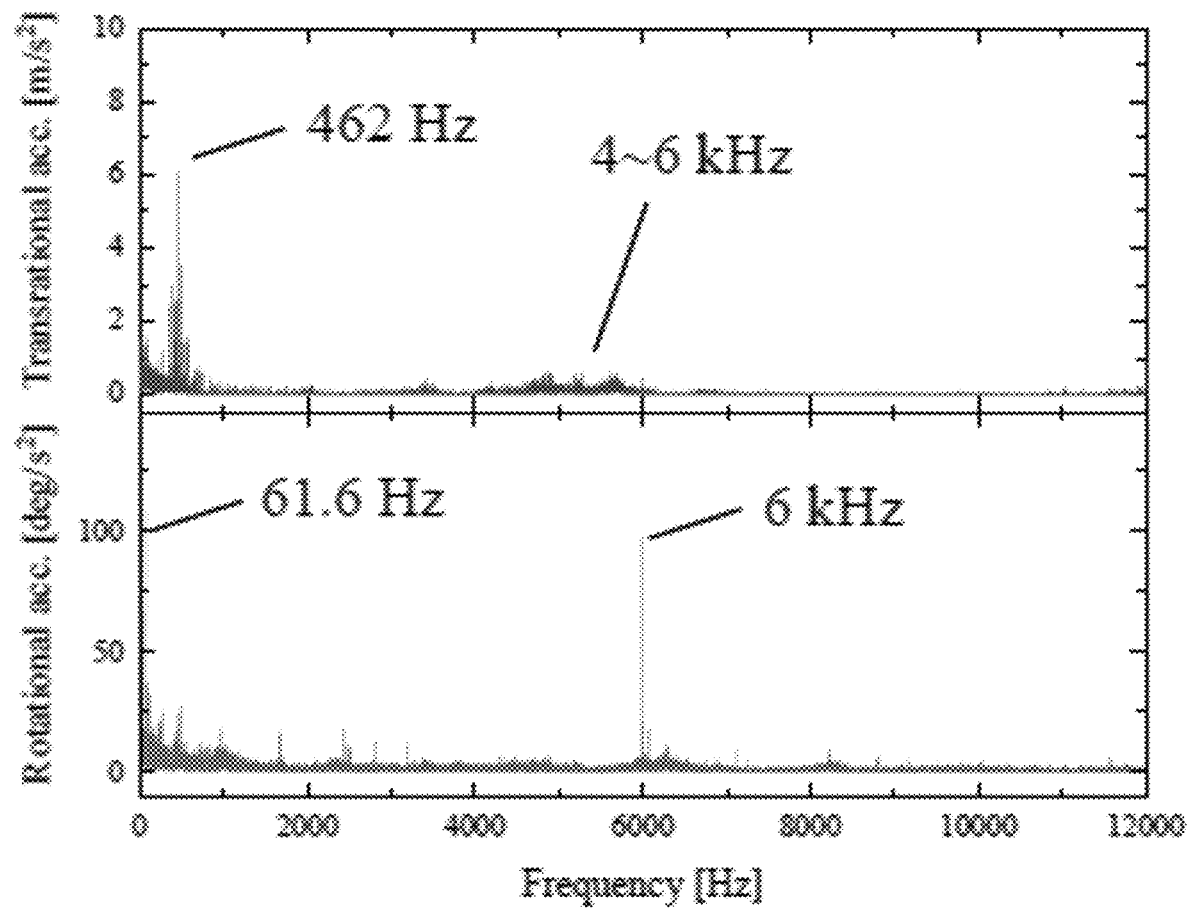

FIGS. 9A and 9B show the results of monitoring cutting resistance waveforms and high-resolution waveforms of the vibrational acceleration by the vibration measurement device in the case where the rotational speed of the end mill was increased by 50 rpm increments in the range of 1500 to 3000 rpm (for each machining distance of about 5 mm in feed direction) during machining of one pass (machining distance of 200 mm in the feed direction) with a feed amount per blade being fixed to 0.06 mm/tooth. It is clear that the presence of stable and unstable rotational speeds in both physical quantities along reproduced chattering charts can be monitored. Here, FIGS. 10A and 10B show the results of fast Fourier transform analysis (hereinafter also referred to as "FFT analysis") of both the physical quantities performed by focusing on the rotational speed of 1850 rpm during stable machining. According to the result of the FFT analysis of the cutting resistance waveforms in FIG. 10A, peaks were found around 61.6 Hz. This is equivalent to the cutting cycle at the time of machining with a tool of two blades at the rotational speed of 1850 rpm, and can be considered to represent a stable machining state. On the other hand, according to the result of FFT analysis of the high-resolution waveforms of the vibrational acceleration in FIG. 10B, peaks were found around 462 Hz in the Xm direction which was considered to be a bending natural frequency of the spindle of the BT40 machining center. As is clear from FIG. 10A, vibration of 462 Hz did not occur at 1850 rpm, and the stable machining state was observed. The reason why the frequency in the vicinity of the bending natural frequency of the spindle appeared as a peak is considered to be attributed to free vibration that is caused by vibration of the tool due to the load generated during machining with one blade of the end mill. Vibration in the vicinity of 4 kHz to 6 kHz was also slightly visible. Here, when the holder is regarded as a beam having one end fixed and the other end free with the end surface of the holder being the fixed end, and the cross-section is considered to be circular, and the vibration is considered to be of a primary mode, the bending natural frequency can be expressed by the following expression.

$$f_1 = 0.14 \frac{d}{l^2} \sqrt{\frac{E}{\rho}} \qquad \text{[Expression 1]}$$

In the expression, l is a tool protrusion amount, d is a tool diameter, E is a longitudinal elastic modulus, and p is density. The core thickness of the tool is ϕ 6.5 mm, the protrusion amount is 33 mm, the longitudinal elastic modulus of cemented carbide is 550 GPa, and the density is 14250 kg/m³. As a result of calculation by substituting these parameters into Expression (1), f1 is 5187 Hz. The frequency of 5187 Hz also coincides with 4 to 6 kHz appeared as a result of FFT in the Xm direction shown in (b) of FIG. 4. Hence, the vibration in this frequency band is considered to be attributed to the bending natural frequency of the tool.

Figure 11A:
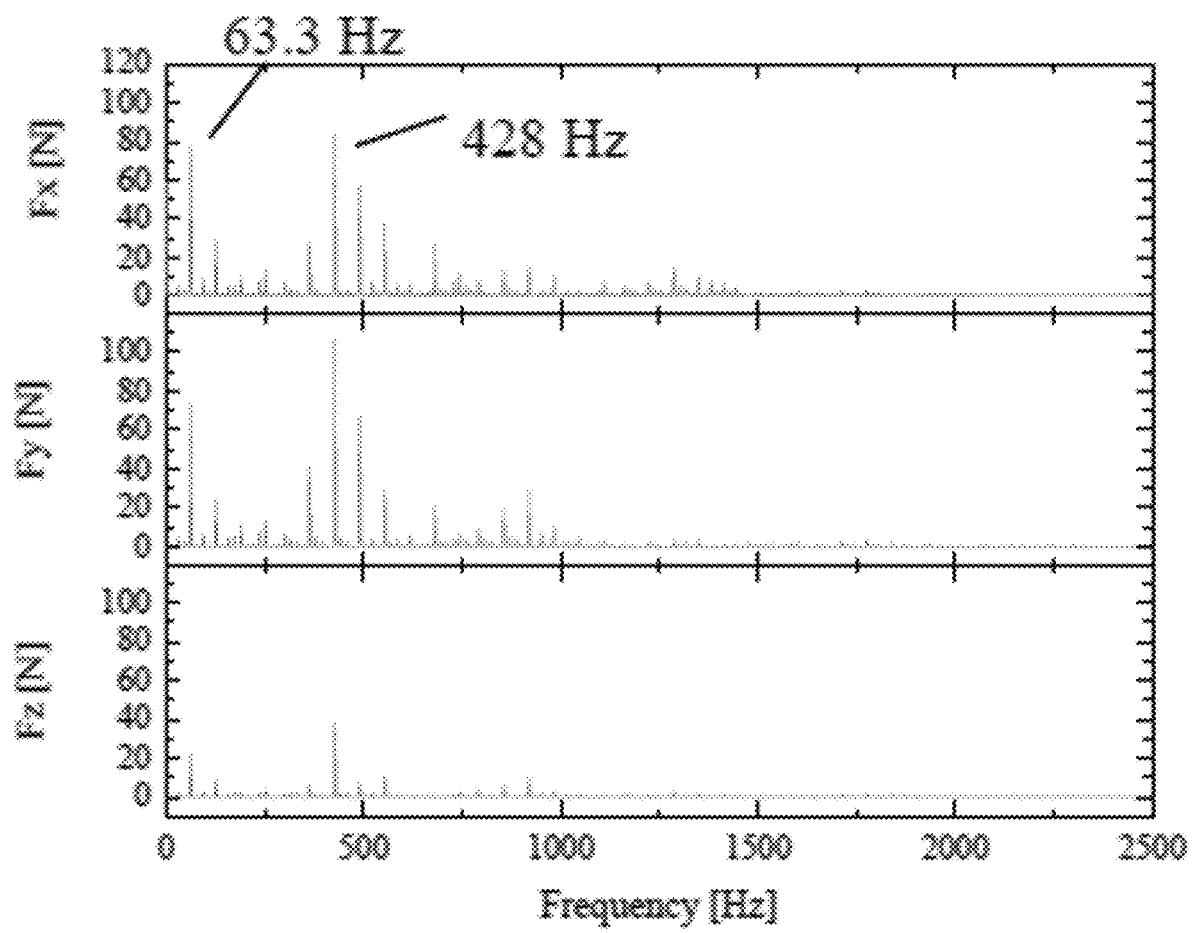
FIGS. 11A-11B show the result of FFT analysis of both physical quantities by focusing on the rotational speed of 1900 rpm during unstable machining in the experimental example 2.
Figure 11B:
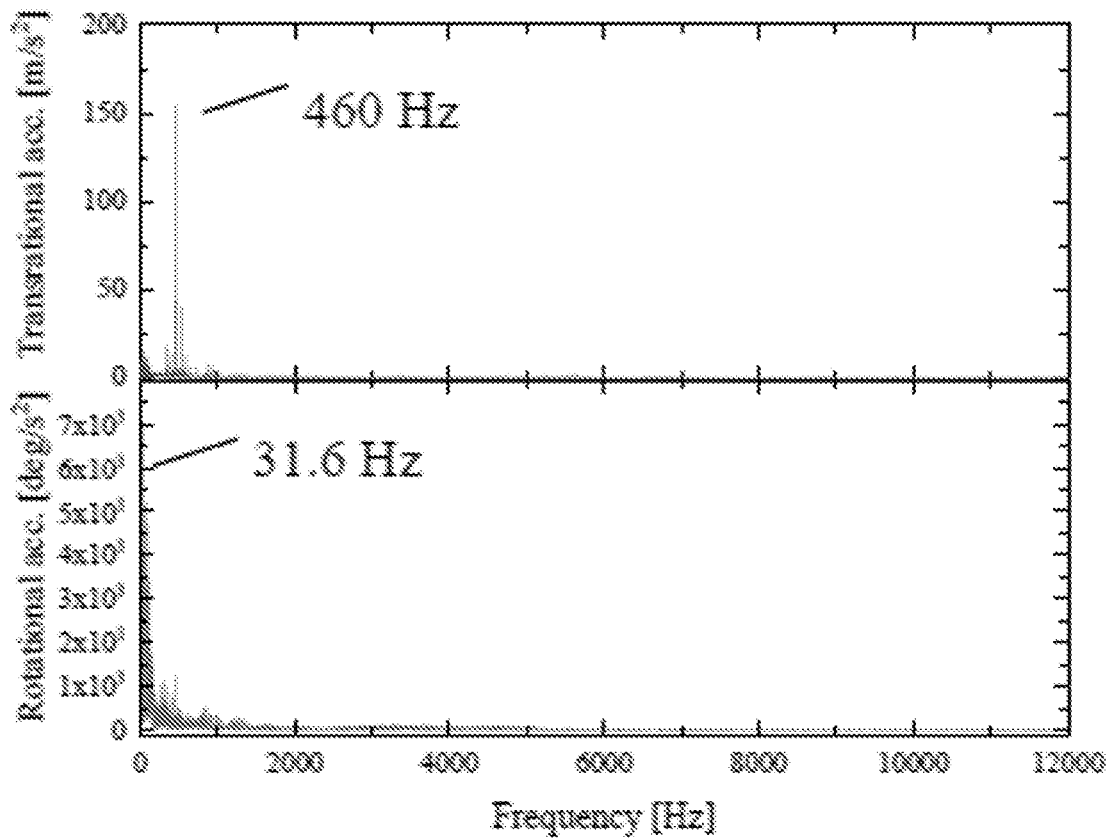

Moreover, in the Rm direction, a peak was seen around 6 kHz, which was also observed at other rotational speeds and also occurred during idling of the spindle, and therefore the peak is considered to be generated due to the influence of dynamic properties of the spindle including a servo system in the rotational direction or torsional natural vibration of the tool holder system. Next, FIGS. 11A and 11B show the results of fast Fourier transform analysis of both the physical quantities performed by focusing on the rotational speed of 1900 rpm during unstable machining. According to the result of FFT of the cutting resistance waveform in FIG. 11A, a peak of 63.3 Hz corresponding to the cutting cycle and a peak of 428 Hz caused by the occurrence of chattering vibration in a bending direction of the spindle were observed. On the other hand, according to the result of FFT analysis of the high-resolution waveforms of the vibrational acceleration in FIG. 11B, a peak of 460 Hz is observed in the Xm direction. While there is a slight difference from the peak of 428 Hz observed in the FFT of the cutting resistance waveforms in FIG. 11A, the peak is considered to be attributed to the frequency due to the similar chattering vibration in the bending direction of the spindle. Although a peak around 462 Hz is also observed during stable machining in FIG. 11B, there is large differences in peak value between in the stable state and in the unstable state, and this also indicates that monitoring the amplitude during chattering vibration is possible. In the Rm direction, a peak appeared at 31.6 Hz corresponding to one rotation cycle of the tool. Although the cutting cycle was 63.3 Hz, it is considered that chattering vibration occurred in the bending direction of the spindle and caused the cutting amounts of two blades of the end mill unbalanced, which resulted in cutting with considerable load applied to one blade. In other words, it was indicated that the proposed monitoring method could monitor the frequency and amplitude information on bending and torsion of tools in end mill machining in detail, and could provide advanced investigation into machining phenomena during stable and unstable machining.

Example 3—Example of Friction Stir Joining

Experiment and Study Methods

A tool shape was such that a shoulder diameter was 14 mm and a probe was M4M5 in a taper shape processed to have a left-threaded groove with a pitch of 0.8 mm with a probe length of 4.5 mm. The tool was made of heat processed SKD61 having HRC53, and a material to be joined was A6061 with a thickness of 5 mm. A joining distance was 80 mm. Vibrational acceleration was detected by arranging acceleration sensors within the tool holder. As described before, four acceleration sensors with sensitivity in one axial direction were arranged in the holder at equal intervals on the Xm and Ym axes of the rotation coordinate system so as to have sensitivity in the rotational direction, and the vibrational acceleration in the bending direction of the tool was measured by calculation. The vibrational acceleration in an Rm direction that indicates the rotational direction can be provided by calculation. Furthermore, root mean square (RMS) calculation was performed with an integration time of 0.1 s to detect the vibrational acceleration during joining by wireless transmission with transmission frequency of 50 Hz. A vertical machining center was used as a machining device. The joining conditions included: tool rotational speeds of 500, 1000, 1500 rpm; tool insertion speed of 30 mm/min; retention time of 5 sec; joining speed of 300 mm/min, tool indentation depth of 4.8 mm; and an advance angle of 0 degree.

Experiment and Study Results and Remarks

Figure 12:
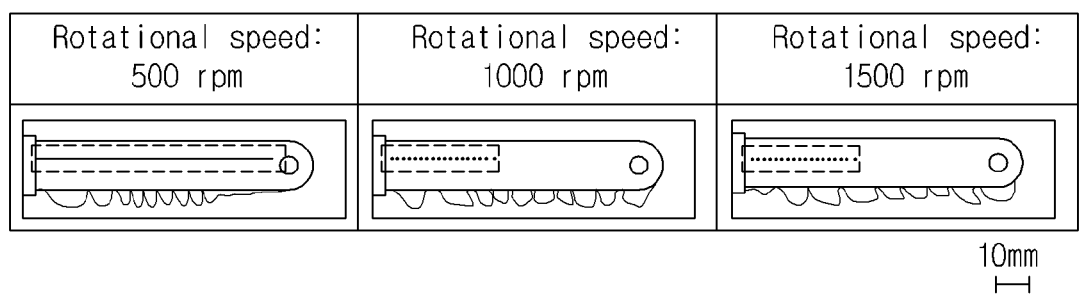
FIG. 12 is a photograph view showing fluoroscopic images under respective conditions, in all of which an internal defect is observed at the position enclosed by a dashed line in an experimental example 3.

FIG. 12 shows fluoroscopic images under respective conditions, in all of which an internal defect was observed at the position enclosed by a dashed line. However, at the rotational speed of 500 rpm, the defect was observed in the entire region of a joint, whereas at the rotational speeds of 1000 rpm and 1500 rpm, a relatively small defect was generated at an initially joined portion, the defect being similar in size at both 1000 rpm and 1500 rpm. At the rotational speed of 500 rpm, it is presumed that the main cause of the defect was heat input deficiency, whereas at the rotational speed of 1000 rpm and 1500 rpm, it is presumed that the shoulder was pushed deeply to cause excessive discharge of burr, so that a groove generated when the tool passed was not filled with the material.

Figure 13:
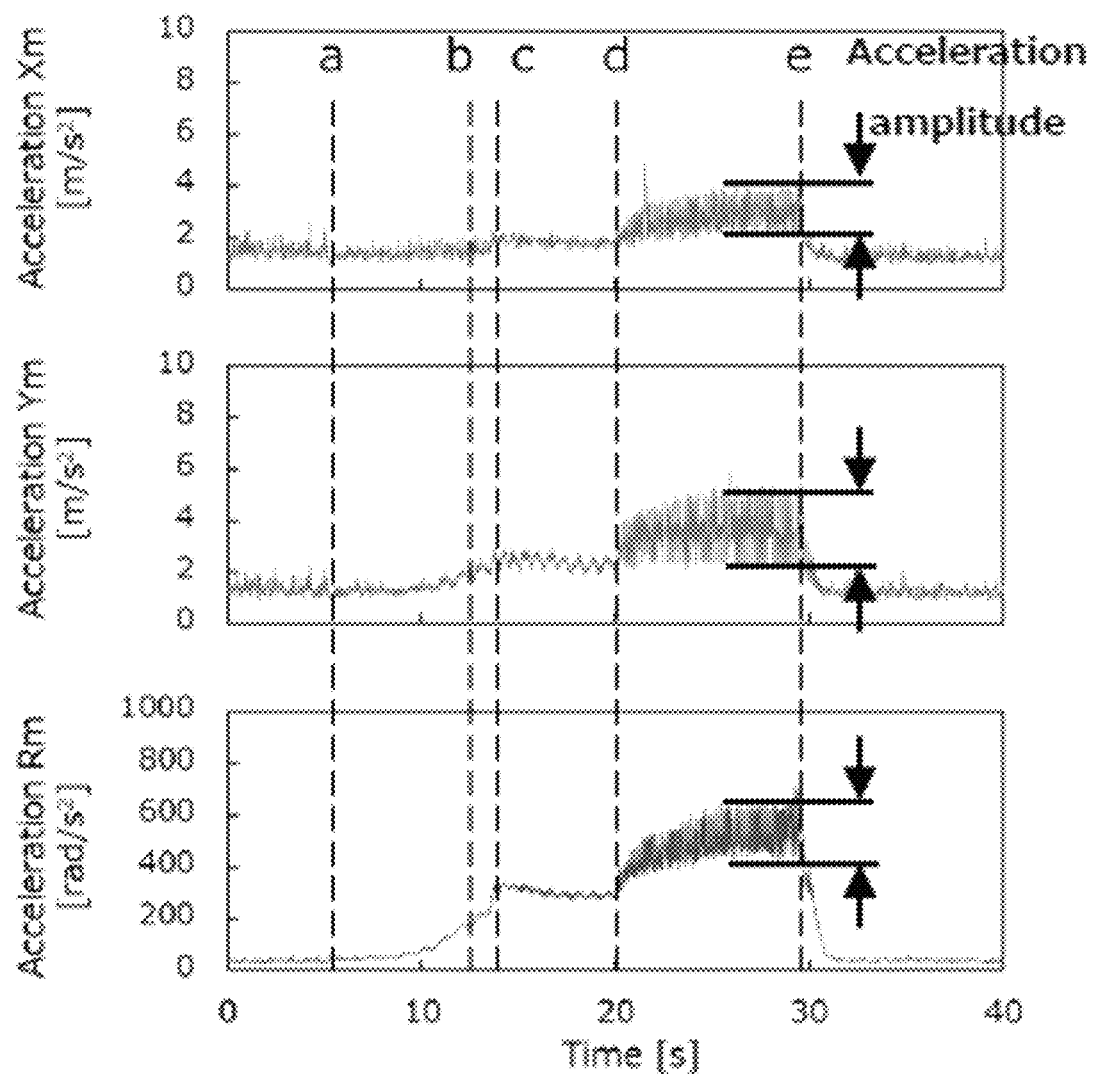
FIG. 13 is a graph view showing a time change of the vibrational acceleration during joining at a tool rotational speed of 500 rpm in the experimental example 3.

FIG. 13 shows a time change of the vibrational acceleration during joining at the tool rotational speed of 500 rpm. At point a in FIG. 13, the probe touched the material to be joined. At point b, the shoulder touched the material to be joined. In the range of points c to d, the machining device is retained, and in the range of points d to e, joint feeding was performed.

Figure 14:
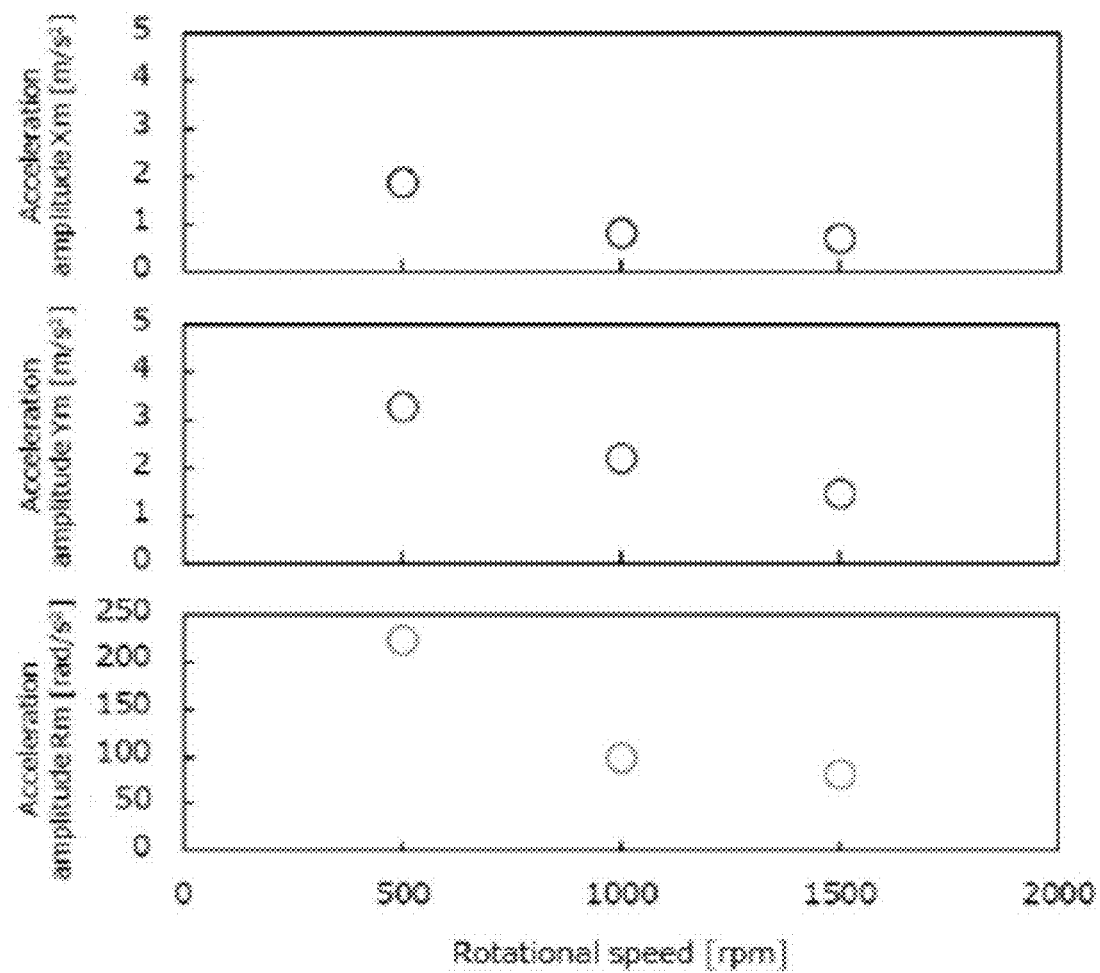
FIG. 14 shows the relationship between the rotational speed and amplitude of vibrational acceleration during joint feeding in the experimental example 3.

FIG. 14 shows the relationship between the rotational speed and amplitude of vibrational acceleration during joint feeding. The amplitude of the vibrational acceleration in the Rm direction in particular was the largest at the rotational speed of 500 rpm, and the amplitudes at 1000 rpm and 1500 rpm were smaller than the amplitude at 500 rpm. The amplitudes at 1000 rpm and 1500 rpm were similar. Since the relationship between these magnitudes was similar to the relationship between the sizes of the internal defect obtained from observation results of the fluoroscopic images, it was suggested that there was a correlation between the size of the internal defect and the magnitude of the amplitude of vibrational acceleration.

Example 4—(Example of Comparison Between High-Resolution Waveforms and Waveforms after Autocorrelation Processing (Autocorrelation Coefficient)

Figure 15:
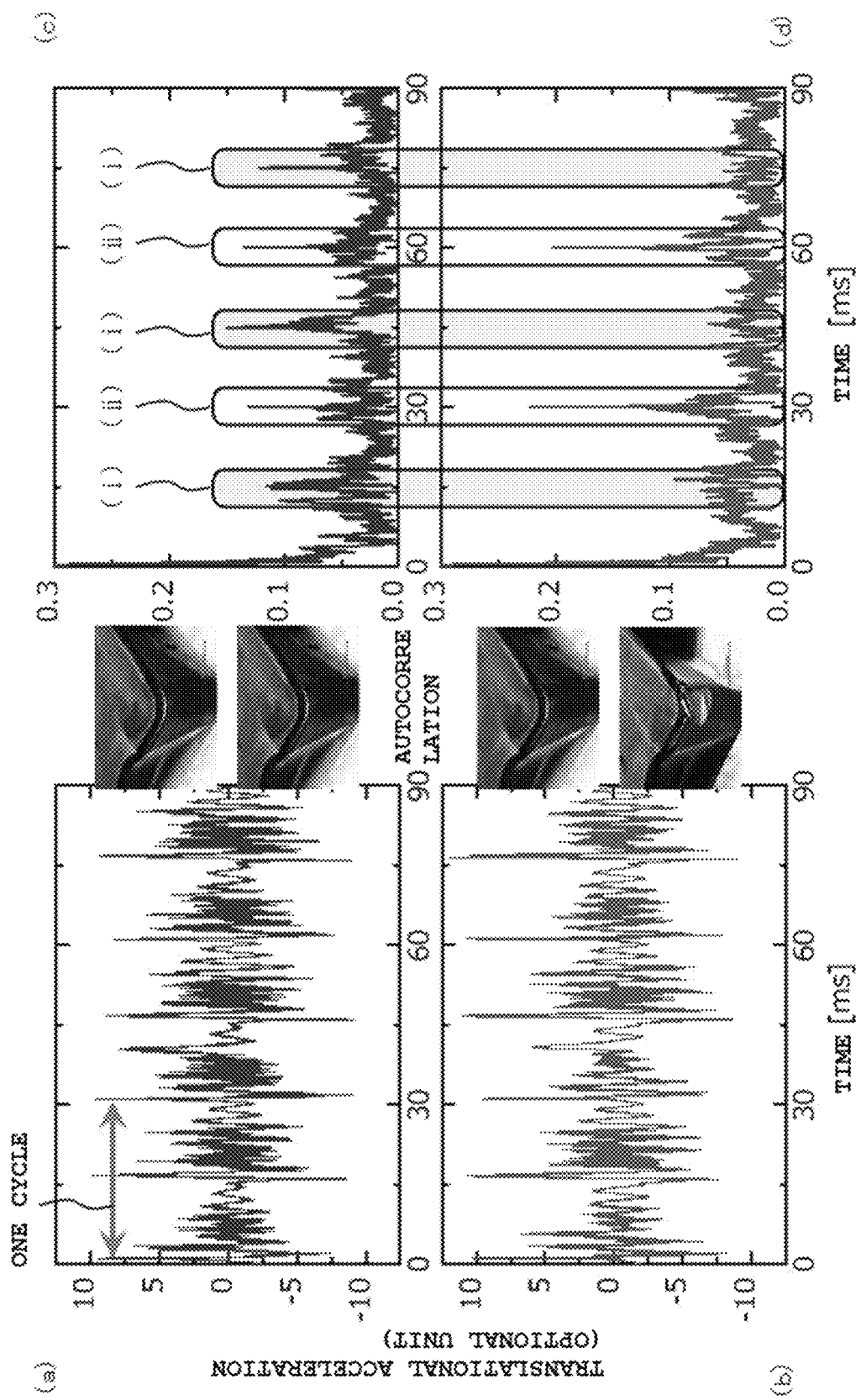
FIG. 15 shows high-resolution waveforms at the time of cutting with a slow-away end mill (two blades) as a cutter having a plurality of blades and waveforms subjected to autocorrelation processing.

FIG. 15 shows high-resolution waveforms at the time of cutting with a slow-away end mill (two blades) as a cutter with a plurality of blades and waveforms subjected to autocorrelation processing. In FIG. 15, an upper left row (a) shows a vibration signal of a high-resolution waveform at the translational acceleration (x-translation) in a typical slow-away end mill (2 blades), an upper middle row shows a photograph view of one blade and the other blade of the slow-away end mill, and an upper right row (c) shows a signal after the vibration signal of the high-resolution waveform of (a) was subjected to autocorrelation processing. A lower left row (b) shows a vibration signal of a high-resolution waveform at the translational acceleration (x-translation) in the typical slow-away end mill (2 blades) with one blade being damaged, a lower middle row shows a photograph view of one blade (upper side) and the other damaged blade (lower side) of the slow-away end mill, and a lower right row (d) shows a signal after the vibration signal of the high-resolution waveform of (b) was subjected to autocorrelation processing.

The autocorrelation processing herein is for calculating a correlation coefficient between original signal data and a copy of the original signal data with time lag from the original signal data with respect to a slow-away end mill rotating at rotational speed of 2000 [rpm] and a cycle of 30 [ms] (see an arrow "one cycle" in (a)) as shown in (a) and (b). The horizontal axis represents the time lag from the original signal data and the vertical axis represents the calculated correlation coefficient.

As shown in (a) and (b) of FIG. 15, it is found out that even with damage of the blade of the slow-away end mill, there is no significant difference in the high-resolution waveform itself, which is not subjected to autocorrelation processing. On the other hand, in the signals in (c) and (d) of FIG. 15, after autocorrelation processing, waveforms of the respective blades (waveform (i) and waveform (ii)) are unchanged in the typical slow-away end mill. However, when one blade is in a damaged state, it is revealed that the peak of the waveform is significantly different for each blade (=every half-cycle) (the peak of the waveform (ii) has a larger autocorrelation coefficient than the peak of the waveform (i)). Therefore, it is found out that the presence of abnormality such as damage is clarified by seeing the autocorrelation coefficient in a cutter having a plurality of blades rotating in a constant cycle, and therefore the autocorrelation coefficient can be used as an indicator of abnormality determination.

Example 5—Example of Detecting Defect Inside Material During Drilling

Figure 16:
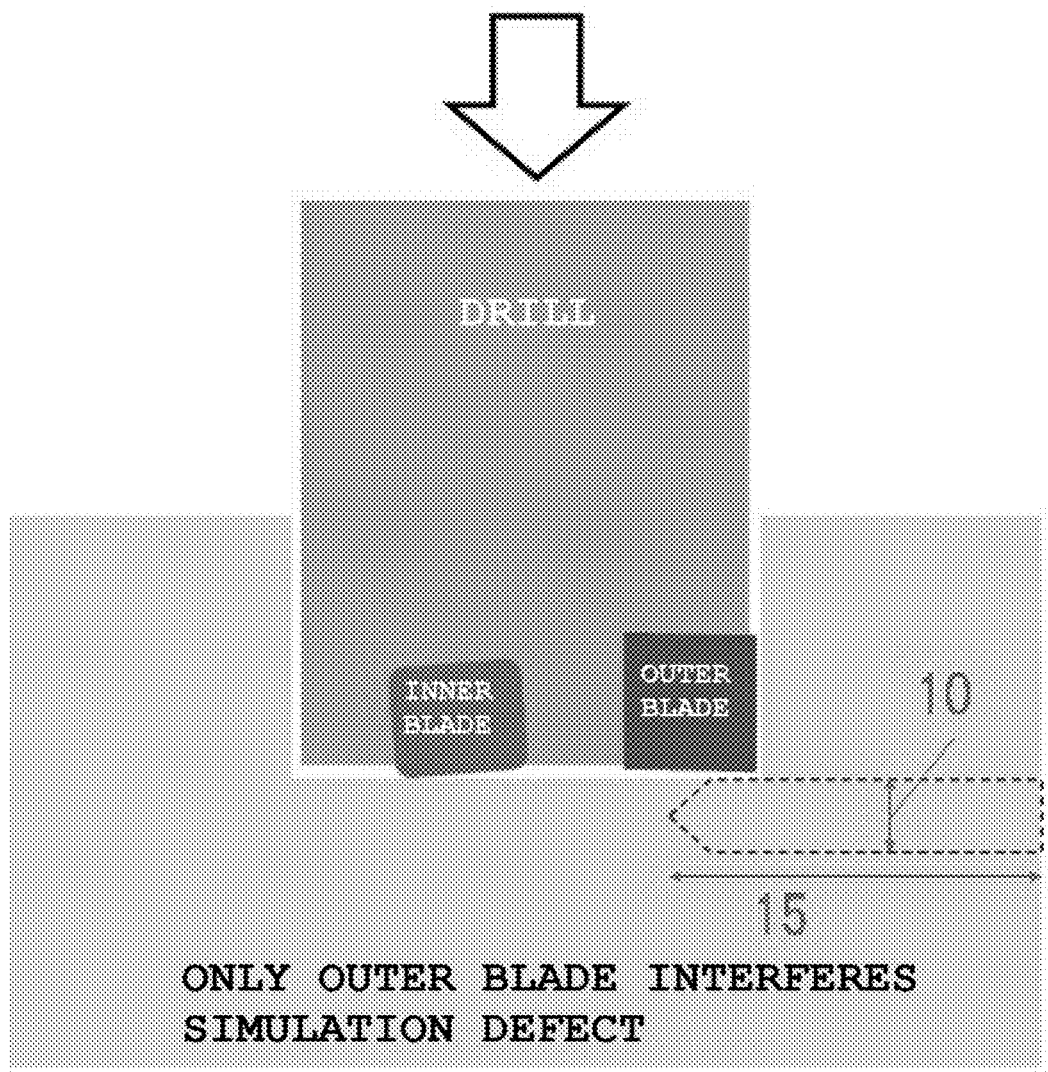
FIG. 16 is a schematic view of a slow-away drill having two blades, an inner and an outer blade, used in Example 5.

A tool shaped as a slow-away drill with two blades including an inner blade and an outer blade as schematically shown in FIG. 16, that is, a slow-away drill 880-D3200L40-03 made by Sandvik to be specific, was used. A material to be joined was S50C with a thickness of 40 mm provided with a simulation defect with a depth of 10 mm and a width of 15 mm. Vibrational acceleration was detected by arranging acceleration sensors within the tool holder. As described in the foregoing, four acceleration sensors with sensitivity in one axial direction were arranged in the holder at equal intervals on the X and Y axes of the rotation coordinate system so as to have sensitivity in the rotational direction, and the vibrational acceleration in the bending direction of the tool was measured by calculation. In addition, the vibrational acceleration in an R direction indicating the rotational direction can be provided by calculation. The cutting conditions included V=60 m/min, and f=0.2 mm. As coolant, water-soluble cutting oil was used to perform the experiment. A vertical machining center was used as a machining device.

Figure 17:
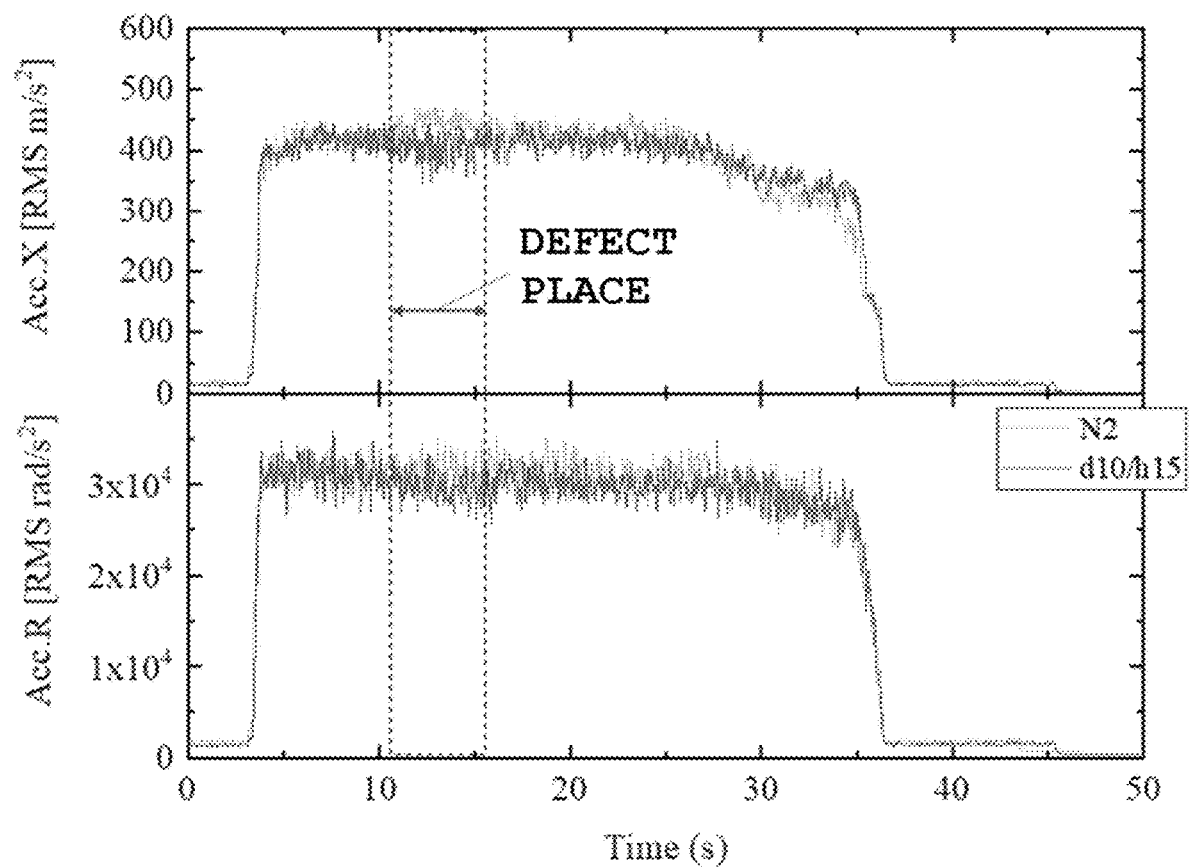
FIG. 17 shows a detection result of vibrational acceleration subjected to typical RMS calculation in the slow-away drill shown in FIG. 16.

FIG. 17 shows the result of performing typical root mean square (RMS) calculation with an integration time of 0.1 s to detect the vibrational acceleration during cutting by wireless transmission with transmission frequency of 50 Hz. According to FIG. 17, there was little difference between a place with the simulation defect and a place without the simulation defect both in the translational direction (Acc. X) and the rotational direction (Acc. R). This means that the data is RMS-processed with an integration time of 0.1 s, and therefore the defect cannot be detected.

Figure 18:
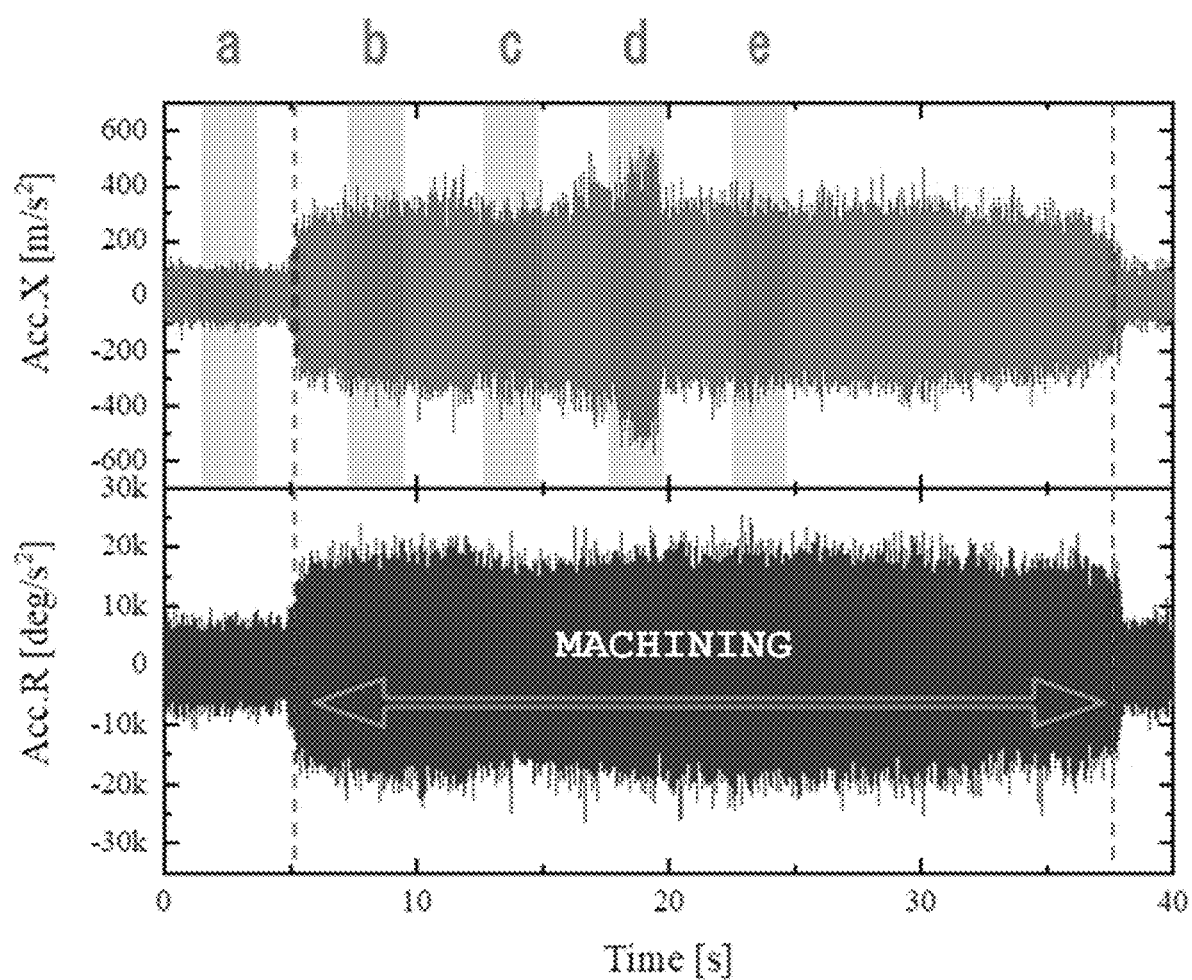
FIG. 18 shows detection results of vibrational acceleration of high-resolution waveforms not subjected to RMS processing in a translational direction (Acc. X) and a rotational direction (Acc. R) as in FIG. 17.

Next, FIG. 18 shows detection results of vibrational acceleration of a high-resolution waveform at a high sampling rate not subjected to RMS processing in the translational direction (Acc. X) and the rotational direction (Acc. R) as in FIG. 17. In FIG. 18, the drill is idling in time domain a, the drill is cutting at the place without simulation defect in time domain b and time domain e, and the drill is cutting at the place with the simulation defect in time domain c and time domain d. According to FIG. 18, there is little difference between a place with the simulation defect and a place without the simulation defect also in the high-resolution waveform that is a raw acceleration waveform.

Figure 19:
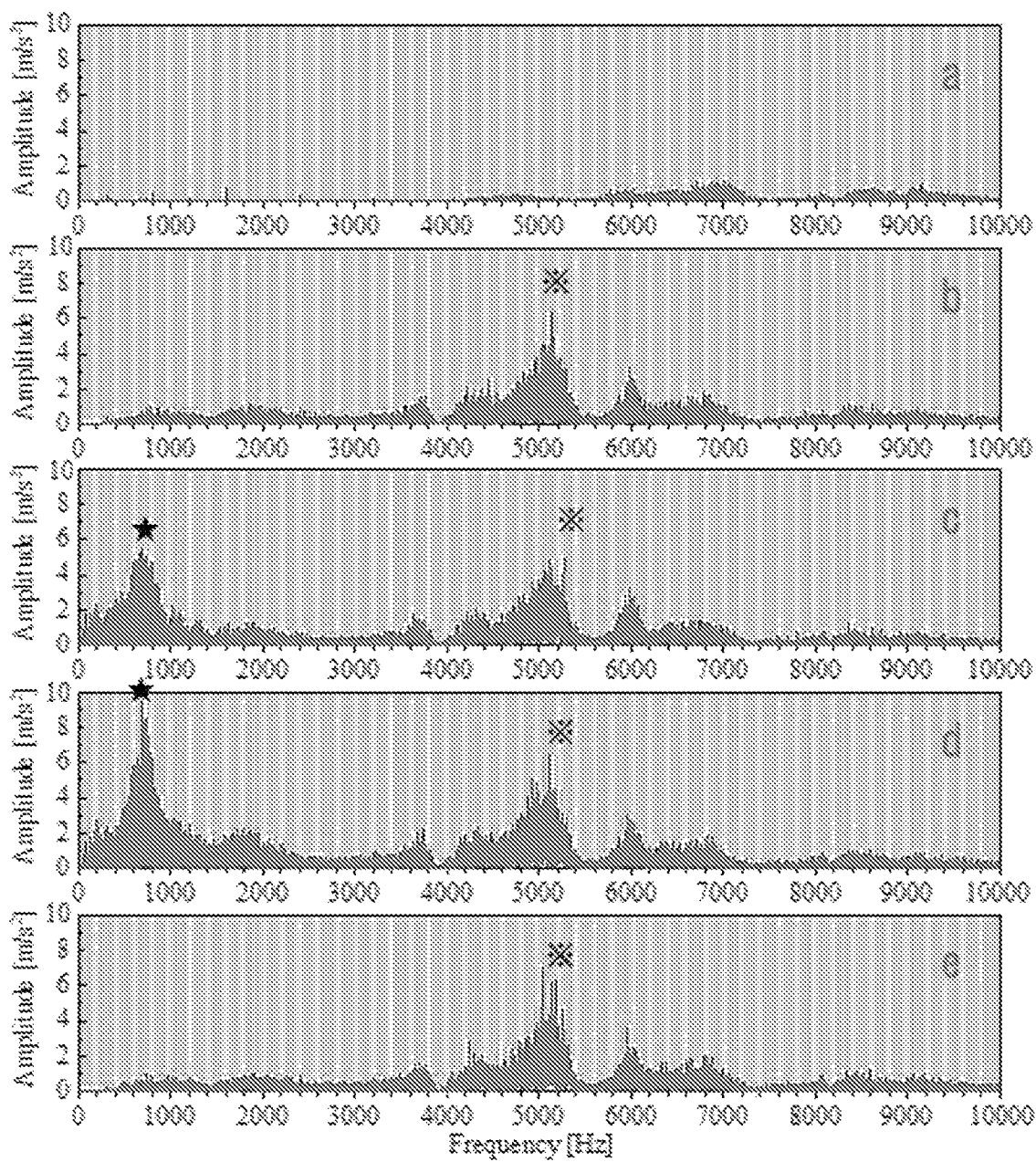
FIG. 19 shows signal waveforms obtained by applying FFT transform processing to a high-resolution waveform signal for each time domain in FIG. 18.

Next, FIG. 19 shows signal waveforms obtained by applying FFT transform processing to a high-resolution waveform signal for each time domain a to e in FIG. 18. According to FIG. 19, a peak at frequencies below 2000 Hz is detected only in the signal waveforms in the time domain c and the time domain d where cutting is performed at the place with the simulation defect as shown by a star mark, whereas a peak is detected at frequencies in the vicinity of 5000 Hz in all the time domains b, c, d, and e where cutting is performed with or without the simulation defect as shown by * mark. In other words, it is considered that the vibration signal in the vicinity of 5000 Hz is noise, and the influence of the simulation defect is detected by vibration signals below 2000 Hz.

Figure 20:
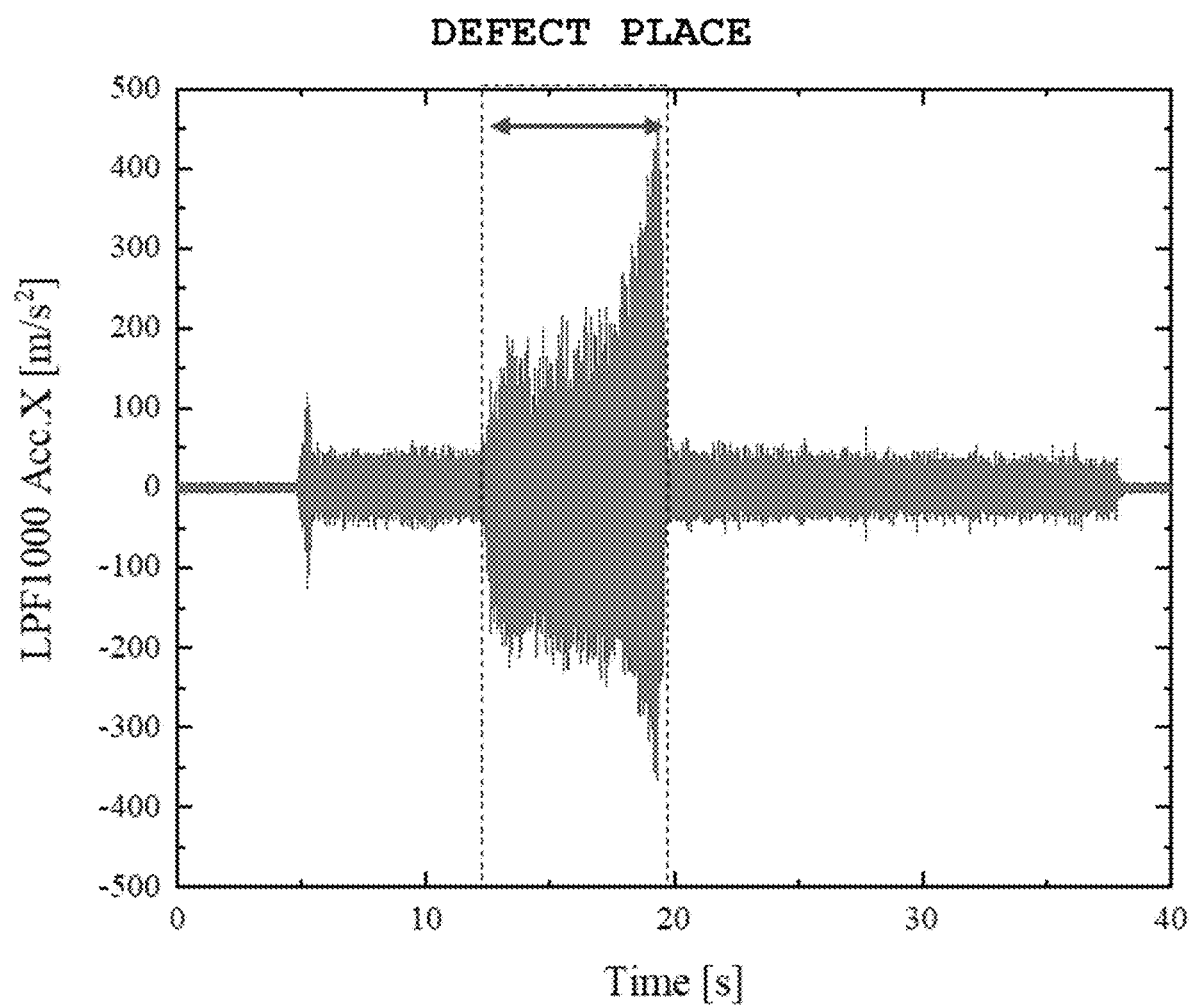
FIG. 20 shows a signal with frequencies below 2000 Hz extracted from the vibration signal of a high-resolution waveform in FIG. 18.
Figure 21:
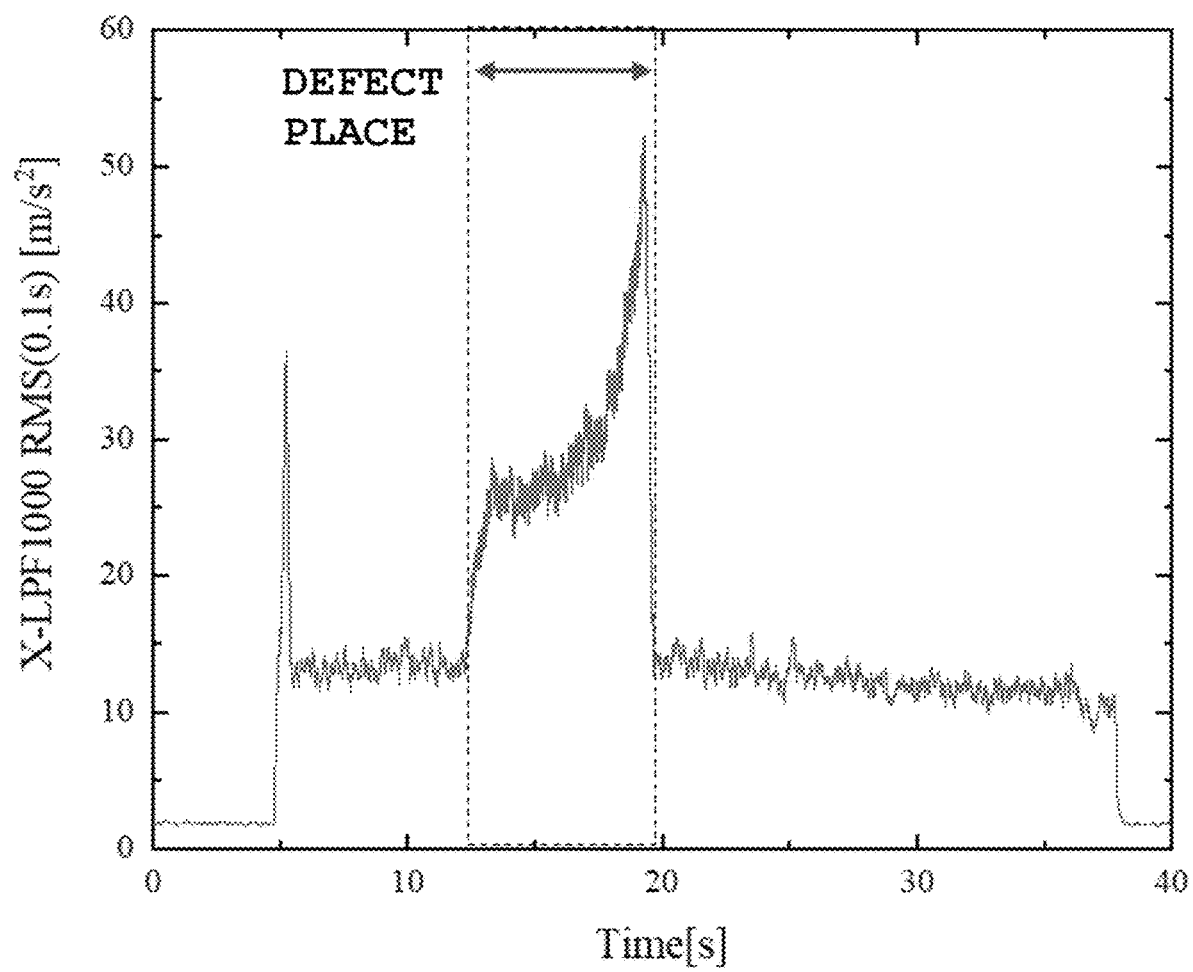
FIG. 21 shows the frequency data in FIG. 20 subjected to RMS processing.

Therefore, only the frequencies below 2000 Hz, which were influenced by the presence or absence of the simulation defect, were extracted from the vibration signal of the high-resolution waveform that was the raw acceleration waveform in FIG. 18, and the frequencies above 2000 Hz were removed as noise. The resultant waveform is shown in FIG. 20 (displayed only in the translational direction (Acc. X)). According to FIG. 20, in the time domain where cutting is performed at the place with the simulation defect, acceleration signals clearly different from those in other time domains are detected. FIG. 21 also shows the frequency data above 2000 Hz which is subjected to RMS processing with an integration time of 0.1 s. According to FIG. 21, acceleration signals at the place with the simulation defect were clearly detected. Therefore, it was verified that FFT processing can be used as a filter function to remove noise, and that RMS processing applied to the raw acceleration waveform with noise removed makes it possible to detect the presence or absence of the simulation defect that was not detected by conventional RMS-processed data.

REFERENCE SIGNS LIST

1 Tool holder unit
2 Rotary spindle
3 Tool holder body
3a Flange part
3c Clearance
4 Battery
5 Chuck
6 Acceleration sensor
7 Radio transmission device (antenna)
9 Control board
11 Tool (cutter)
11a Cantilever
12 Workpiece (work)
13 Tip (cutting edge)
15, 16, 17 Circuit
22 Radio microcontroller (sensor side)
23, 24 Radio transmitter/receiver
25 Radio microcontroller (PC side)
26 Audio input/output device
27 Personal computer
28 Selector switch
31 Receivers
32 Personal computer

The invention claimed is:

1. A vibration measurement device for a rotary tool held by a tool holder that is coupled with a spindle and axially rotates in cooperation with the spindle, the vibration measurement device comprising:
   two pairs of acceleration sensors disposed in a clearance, which is above a chuck of the tool holder, for arrangement of components in the tool holder, the two pairs include a first pair of acceleration sensors at first opposite positions around a rotation axis of the tool holder and a second pair of acceleration sensors at second opposite positions around the rotation axis, the two pairs of acceleration sensors being disposed orthogonally in an X direction and a Y direction around the rotation axis of the tool holder, respectively;
   an amplifier circuit that matches impedance of acceleration information from the acceleration sensors and amplifies voltage;
   a low-pass filter that removes predetermined frequencies from an output signal of the amplifier circuit and that outputs an output signal of the low-pass filter;

a subtraction circuit that outputs a translation vibration signal in the X direction and a translation vibration signal in the Y direction from the output signal of the low-pass filter;

an addition circuit that outputs a vibration signal in a rotational direction from the output signal of the low pass filter;

a radio transmitter/receiver positioned in the tool holder that transmits the translation vibration signal in the X direction, the translation vibration signal in the Y direction, and the vibration signal in the rotational direction to a receiving device separate from the tool holder; and an external radio transmitter/receiver that receives the translation vibration signals in the X direction, the translation vibration signals in the Y direction, and the vibration signal in the rotational direction, which are transmitted from the radio transmitter/receiver positioned in the tool holder, and that displays and/or records the translation vibration signals in the X direction, the translation vibration signals in the Y direction, and the vibration signal in the rotational direction in real time, wherein the radio transmitter/receiver positioned in the tool holder performs A/D conversion of output signals of a waveform that is not subjected to averaging by a root mean square (RMS) calculation including frequency information from the subtraction circuit and the addition circuit, processes the output signals as transmission data, and transmits the output signals without further processing to the receiving device separate from the tool holder.

2. The vibration measurement device according to claim 1, wherein the external radio transmitter/receiver displays and/or records the output signals of the waveform received from the radio transmitter/receiver in real time without further processing and after fast Fourier transform.

3. The vibration measurement device according to claim 1, wherein the external radio transmitter/receiver displays and/or records the output signals of the waveform received from the radio transmitter/receiver in real time without further processing and after autocorrelation processing.

4. The vibration measurement device according to claim 1, comprising:

an extraction filter to extract only an output signal of a specific frequency domain out of output signals that are the vibration signals output in real time during machining from the acceleration sensors, the output signals being not subjected to the RMS averaging by RMS calculation including frequency information, wherein the vibration measurement device averages and outputs the output signal extracted by the extraction filter.

5. The vibration detector according to claim 4, wherein the specific frequency domain subjected to extraction in the extraction filter is a frequency domain determined to be necessary based on an output signal obtained by applying fast Fourier transform to the output signal having the waveform.

\* \* \* \* \*